(12) United States Patent
Moynihan et al.

(10) Patent No.: US 11,939,210 B1
(45) Date of Patent: Mar. 26, 2024

(54) SYSTEMS FOR DECREASING EXCESS OCTANE DURING GASOLINE BLENDING

(71) Applicant: PHILLILPS 66 COMPANY, Houston, TX (US)

(72) Inventors: James C. Moynihan, St. Louis, MO (US); Paul M. Ryder, Owasso, OK (US); Robert L. Schnefke, Houston, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 18/506,553

(22) Filed: Nov. 10, 2023

(51) Int. Cl.
*B67D 7/74* (2010.01)
*B67D 7/36* (2010.01)
*G05D 11/13* (2006.01)

(52) U.S. Cl.
CPC ............... *B67D 7/744* (2013.01); *B67D 7/36* (2013.01); *G05D 11/139* (2013.01); *B67D 2007/747* (2013.01); *Y10T 137/2509* (2015.04); *Y10T 137/87684* (2015.04); *Y10T 137/87772* (2015.04)

(58) Field of Classification Search
CPC .. B67D 2007/747; B67D 7/743; B67D 7/744; B67D 7/36; G05D 11/139; Y10T 137/2509; Y10T 137/87684; Y10T 137/87772
USPC ........ 700/239; 222/132, 145.5; 137/93, 606, 137/870
See application file for complete search history.

(56) References Cited

U.S. PATENT DOCUMENTS

| | | | | | |
|---|---|---|---|---|---|
| 3,383,190 | A | * | 5/1968 | Weber .................... | G05D 21/02 203/1 |
| 3,999,959 | A | * | 12/1976 | Bajek .................... | G05D 21/02 422/62 |
| 4,978,029 | A | * | 12/1990 | Furrow .................. | B67D 7/744 222/134 |
| 5,018,645 | A | * | 5/1991 | Zinsmeyer ............. | B67D 7/744 222/14 |
| 5,029,100 | A | * | 7/1991 | Young .................. | G05D 11/132 700/265 |
| 5,163,586 | A | * | 11/1992 | Zinsmeyer ............. | B67D 7/744 222/14 |
| 5,412,581 | A | * | 5/1995 | Tackett ................ | G01N 21/359 702/30 |
| 5,469,830 | A | * | 11/1995 | Gonzalez ............ | F02D 19/0684 123/515 |
| 5,630,528 | A | * | 5/1997 | Nanaji ..................... | B67D 7/08 222/134 |
| 5,757,664 | A | * | 5/1998 | Rogers .................. | G01F 23/802 702/182 |
| 5,921,263 | A | * | 7/1999 | Negley, III ............ | B67D 7/744 137/3 |
| 5,975,353 | A | * | 11/1999 | Finlayson ............ | G05D 11/132 222/26 |

(Continued)

*Primary Examiner* — William M McCalister
(74) *Attorney, Agent, or Firm* — Phillips 66 Company

(57) ABSTRACT

Systems operable to blend at least one finished gasoline from a refined petroleum product comprising at least one neat gasoline with ethanol and optionally butane utilizing a blend model that calculates a volumetric blend ratio comprising at least one neat gasoline, ethanol and optionally, butane. The blend model incorporates estimated values for the octane number and the volatility of the ethanol and butane when calculating the volumetric blend ratio.

17 Claims, 3 Drawing Sheets

(56) References Cited

U.S. PATENT DOCUMENTS

| | | | | |
|---|---|---|---|---|
| 6,009,761 | A * | 1/2000 | Taylor | B67D 7/16 |
| | | | | 141/105 |
| 6,065,638 | A * | 5/2000 | Terranova | B67D 7/744 |
| | | | | 700/285 |
| 6,112,134 | A * | 8/2000 | Terranova | G05D 11/132 |
| | | | | 700/239 |
| 6,163,738 | A * | 12/2000 | Miller | G01N 33/2829 |
| | | | | 700/242 |
| 6,223,788 | B1 * | 5/2001 | Taylor | B67D 7/423 |
| | | | | 141/105 |
| 6,422,465 | B2 * | 7/2002 | Miller | B67D 7/744 |
| | | | | 141/94 |
| 8,176,951 | B2 | 5/2012 | Mattingly et al. | |
| 8,192,510 | B2 | 6/2012 | Mattingly et al. | |
| 8,518,131 | B2 | 8/2013 | Mattingly et al. | |
| 9,207,686 | B2 | 12/2015 | Mattingly et al. | |
| 9,321,977 | B2 | 4/2016 | Vanderbur | |
| 9,494,948 | B2 | 11/2016 | Mattingly et al. | |
| 9,606,548 | B2 | 3/2017 | Mattingly et al. | |
| 9,644,163 | B2 | 5/2017 | Vanderbur | |
| 9,939,821 | B2 * | 4/2018 | Wadhwa | G05D 11/00 |
| 10,082,807 | B2 * | 9/2018 | Lambert | G01N 33/2829 |
| 10,228,708 | B2 * | 3/2019 | Lambert | G01N 21/359 |
| 10,246,656 | B2 | 4/2019 | Mattingly et al. | |
| 10,428,289 | B2 | 10/2019 | Vandurbur | |
| 10,508,017 | B2 * | 12/2019 | Al Khowaiter | B67D 7/78 |
| 11,339,049 | B2 * | 5/2022 | Johnson | B67D 7/78 |
| 11,441,088 | B2 * | 9/2022 | Robbins | G05D 11/139 |
| 2004/0129726 | A1 * | 7/2004 | Hutchinson | B65D 90/028 |
| | | | | 222/131 |
| 2005/0223633 | A1 * | 10/2005 | Sankaranarayanan | |
| | | | | G05D 11/139 |
| | | | | 44/629 |
| 2016/0332861 | A1 * | 11/2016 | Johnson | B67D 7/78 |
| 2019/0177629 | A1 | 6/2019 | Mattingly et al. | |
| 2020/0291316 | A1 * | 9/2020 | Robbins | G05D 11/132 |
| 2021/0101795 | A1 * | 4/2021 | Johnson | B67D 7/78 |

* cited by examiner

SYSTEMS FOR DECREASING EXCESS OCTANE DURING GASOLINE BLENDING

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to method and systems for blending butane and ethanol into gasoline or gasoline blend components.

BACKGROUND OF THE INVENTION

"Excess fuel octane" refers to the profit that is lost when the Anti Knock Index (AKI) of a given batch of finished transportation fuel exceeds government-mandated octane specifications. Refiners attempt to minimize this excess, as excess fuel octane represents a significant percentage of lost profit opportunity for a modern petroleum refinery and therefore remains an opportunity to capture significant value.

Commercial gasoline blending to meet minimum octane specifications often involves octane measurements that not only include one or more gasoline blend stocks, but also the ethanol and butane streams to be added to produce a finished gasoline.

What is needed are systems and processes that can rapidly and accurately blend a finished gasoline at decreased cost, and without excess octane, by obtaining real-time octane values for a one or more gasoline streams, then rapidly blending at least one of these gasoline streams with an ethanol stream and optionally, a butane stream to produce a finished gasoline while using pre-set octane number estimates for the ethanol and butane.

BRIEF SUMMARY OF THE DISCLOSURE

Some embodiments comprise a system that comprises: a premium octane pipe capable of flowing a premium octane gasoline and comprising a first valve capable of regulating flow through the premium octane pipe at a known rate; a regular octane pipe capable of flowing a regular octane gasoline and comprising a second valve capable of regulating flow of the regular octane gasoline at a known through the regular octane pipe at a known rate; a butane pipe capable of flowing butane and comprising a third valve capable of regulating flow through the butane pipe at a known rate; a first analyzer cell connected to the premium octane pipe capable of continually obtaining a premium research octane number and a premium motor octane number; a second analyzer cell connected to the regular octane pipe capable of continually obtaining a regular research octane number and a regular motor octane number; and a receptacle downstream of the first analyzer cell and the second analyzer cell that is capable of receiving and blending the premium octane gasoline, the regular octane gasoline, and the butane to produce a finished gasoline, where the first valve, the second valve, and the third valve are capable of regulating a blend ratio of the premium octane gasoline, the regular octane gasoline, and the butane in the blend based on the premium research octane number, the premium motor octane number, the regular research octane number and the regular motor octane number.

In some embodiments of the system, the first valve, the second valve, and the third valve are additionally capable of regulating the blend ratio based on an estimated value for octane number of the butane that is selected from research octane number, motor octane number and anti-knock index.

Some embodiments of the system additionally comprise a first sensor capable of obtaining a first premium volatility measurement from the premium octane neat gasoline and a second sensor capable of obtaining a first regular volatility measurement from the regular octane neat gasoline, where the first premium volatility measurement and the first regular volatility measurement are different members of the group consisting of vapor pressure, distillation temperature and a liquid to vapor ratio temperature and the first valve, the second valve and the third valve are additionally capable of implementing the blend ratio based on the first volatility measurement and the second volatility measurement.

Some embodiments of the system additionally comprise a third sensor capable of obtaining a second premium volatility measurement from the premium octane neat gasoline and a fourth sensor capable of obtaining a second regular volatility measurement from the regular octane neat gasoline, where the second premium volatility measurement and the first premium volatility measurement are different members of the group consisting of vapor pressure, distillation temperature and a liquid to vapor ratio temperature, where the second regular volatility measurement and the first regular volatility measurement are different members of the group consisting of vapor pressure, distillation temperature and a liquid to vapor ratio temperature, where each volatility measurement is accounted for in the blend ratio and where the first valve, the second valve, and the third valve are additionally capable of implementing the blend ratio based upon the second premium volatility measurement and second regular volatility measurement.

In some embodiments of the system, the finished gasoline is a certified gasoline selected from the group consisting of a certified premium octane blended gasoline, a certified mid-grade octane blended gasoline, and a certified regular octane blended gasoline.

In some embodiments of the system, the first analyzer cell and the second analyzer cell are operably connected to the same analyzer or multiple distinct analyzers.

Some embodiments comprise a system that comprises: a premium octane pipe capable of flowing a premium octane neat gasoline having an anti-knock index in the range from 88 to 93 and comprising a first valve capable of regulating flow through the premium octane pipe at a known rate; a regular octane pipe capable of flowing a regular-octane neat gasoline having an anti-knock index in the range from 80 to 87 and comprising a second valve capable of regulating flow through the regular octane pipe at a known rate; a butane pipe capable of flowing butane and comprising a third valve capable of regulating flow through the butane pipe at a known rate; an ethanol pipe capable of flowing ethanol and comprising a fourth valve capable of regulating flow through the ethanol pipe at a known rate; a first analyzer cell connected to the premium octane pipe capable of continually obtaining a premium research octane number and a premium motor octane number; a second analyzer cell connected to the regular octane pipe capable of continually obtaining a regular research octane number and a regular motor octane number; a receptacle downstream of the first analyzer cell and the second analyzer cell capable of receiving a gasoline blend comprising the premium octane neat gasoline, the regular octane neat gasoline, the butane and the ethanol; a programmable logic controller capable of producing the gasoline blend by continuously calculating a volumetric blend ratio of the premium octane neat gasoline, the regular octane neat gasoline, the butane, and the ethanol to produce the gasoline blend, where the calculating of the volumetric blend ratio at least partly depends upon the premium research octane number, the premium motor octane number, the regular research octane number, the regular motor octane number, a predicted value for octane number for the ethanol, a predicted volatility value for the ethanol a predicted octane number value for the butane and a predicted volatility value for the butane, where the programmable logic controller is capable of operating the first valve, the second valve, the third valve and the fourth valve to implement the volumetric blend ratio, and where the gasoline blend is a finished gasoline selected from the group consisting of a finished premium octane blended gasoline, a finished mid-grade octane blended gasoline and a finished regular octane blended gasoline. In some embodiments of the system, the first analyzer cell and the second analyzer cell are operably connected to the same analyzer or multiple distinct analyzers.

Some embodiments additionally comprise a first sensor capable of obtaining a first premium volatility measurement from the premium octane neat gasoline and a second sensor capable of obtaining a first regular volatility measurement from the regular octane neat gasoline, where the first premium volatility measurement and the first regular volatility measurement are the same type of measurement selected from the group consisting of vapor pressure, distillation temperature and a liquid to vapor ratio temperature, wherein the programmable logic controller is capable of receiving and accounting for the first premium volatility measurement and the first regular volatility measurement when calculating the volumetric blend ratio.

Some embodiments additionally comprise a third sensor capable of obtaining a second premium volatility measurement from the premium octane neat gasoline and a fourth sensor capable of obtaining a second regular volatility measurement from the regular octane neat gasoline, where the second premium volatility measurement and the first premium volatility measurement are different members of the group consisting of vapor pressure, distillation temperature and a liquid to vapor ratio temperature for the premium octane neat gasoline, where the second regular volatility measurement and the first regular volatility measurement are different members of the group consisting of vapor pressure, distillation temperature and a liquid to vapor ratio temperature for the regular octane neat gasoline, and where the programmable logic controller is additionally capable of receiving and accounting for the second premium volatility measurement and the second regular volatility measurement when calculating the volumetric blend ratio.

Some embodiments comprise a system for decreasing octane giveaway comprising: a premium octane pipe capable of flowing a premium octane neat gasoline, wherein the premium octane pipe comprises a first valve capable of regulating flow through the premium octane pipe into a first receptacle and second valve capable of regulating flow through the premium octane pipe into a second receptacle; a regular octane pipe capable of flowing a regular-octane neat gasoline, wherein the regular octane pipe comprises a third valve capable of regulating flow through the regular octane pipe into the first receptacle and fourth valve capable of regulating flow through the regular octane pipe into the second receptacle; a butane pipe capable of flowing butane and comprising a fifth valve capable of regulating flow through the butane pipe into the first receptacle and sixth valve capable of regulating flow through the butane pipe into the second receptacle; an ethanol pipe capable of flowing ethanol and comprising a seventh valve capable of regulating flow through the ethanol pipe into the first receptacle and sixth valve capable of regulating flow through the butane pipe into the second receptacle; a first infrared spectroscopy analyzer cell connected to the premium octane pipe to continually obtain a premium research octane number and a premium motor octane number; a second infrared spectroscopy analyzer cell connected to the regular octane pipe that is capable of continually obtaining a regular research octane number and a regular motor octane number; a first receptacle downstream of the first infrared spectroscopy analyzer cell and the second infrared spectroscopy cell capable of receiving and mixing a first splash blend comprising the premium octane neat gasoline, the regular octane neat gasoline, the butane and the ethanol; a second receptacle downstream of the infrared spectroscopy analyzer cell and the secondary infrared spectroscopy cell capable of receiving and mixing a second splash blend comprising the premium octane neat gasoline, the regular octane neat gasoline, the butane and the ethanol to produce a second finished gasoline; a first sensor capable of obtaining a first premium volatility measurement from the premium octane neat gasoline and a second sensor capable of obtaining a second premium volatility measurement from the premium octane neat gasoline, where the first premium volatility measurement and the second premium volatility measurement are different members of the group consisting of vapor pressure, distillation temperature and a liquid to vapor ratio temperature; a third sensor capable of obtaining a first regular volatility measurement from the regular octane neat gasoline and a fourth sensor capable of obtaining a second regular volatility measurement from the regular octane neat gasoline, where the first regular volatility measurement and the second regular volatility measurement are different members of the group consisting of vapor pressure, distillation temperature and a liquid to vapor ratio temperature; a programmable logic controller capable of continuously calculating a first volumetric blend ratio and a second volumetric blend ratio comprising the premium octane neat gasoline, the regular octane neat gasoline, the butane, and the ethanol, where the programmable logic controller is further capable of accounting for the premium research octane number, the premium motor octane number, the regular research octane number, the regular motor octane number and preset values for an octane number and a volatility value for the ethanol and the butane when calculating the first volumetric blend ratio and the second volumetric blend ratio, where the octane number is selected from a research octane number, a motor octane number and an anti-knock index value and the volatility value is selected from a vapor pressure, a distillation temperature and a liquid to vapor ratio temperature, where the programmable logic controller is further capable of receiving and accounting for the first premium volatility measurement, the second premium volatility measurement, the first regular volatility measurement and the second regular volatility measurement when calculating the first volumetric blend ratio and the second volumetric blend ratio, where the programmable logic controller is capable of operating the first valve, the third valve, the fifth valve and the seventh valve to implement the first volumetric blend ratio and produce the first splash blend in the first receptacle, where the programmable logic controller is capable of operating the second valve, the fourth valve, the sixth valve and the eighth valve to implement the second volumetric blend ratio and produce the second splash blend in the second receptacle.

In some embodiments of the system, the first splash blend and the second splash blend are different members of the group consisting of a premium octane blended gasoline, a mid-tier octane blended gasoline, and a regular octane blended gasoline.

In some embodiments of the system, the first analyzer cell and the second analyzer cell reside in either the same analytical analyzer or multiple distinct analytical analyzers.

In some embodiments of the system, the vapor pressure is selected from research octane number, motor octane number and anti-knock index, wherein the distillation temperature is selected from 10 percent distillation temperature, 50 percent distillation temperature and 90 percent distillation temperature, wherein the liquid to vapor ratio temperature is a temperature at which the liquid to vapor ratio equals 20.

In some embodiments of the system, the first premium volatility measurement and the first regular volatility measurement are a vapor pressure measurement and the second premium volatility measurement and the second regular volatility measurement are a 50 percent distillation temperature measurement.

In some embodiments of the system, the premium neat gasoline comprises a research octane number that is larger than the regular neat gasoline research octane number and the premium neat gasoline comprises a motor octane number that is larger than the regular neat gasoline motor octane number.

BRIEF DESCRIPTION OF THE DRAWINGS

A more complete understanding of the present invention and its benefits may be acquired by referring to the follow description taken in conjunction with the accompanying drawings in which.

DETAILED DESCRIPTION

Figure 1:
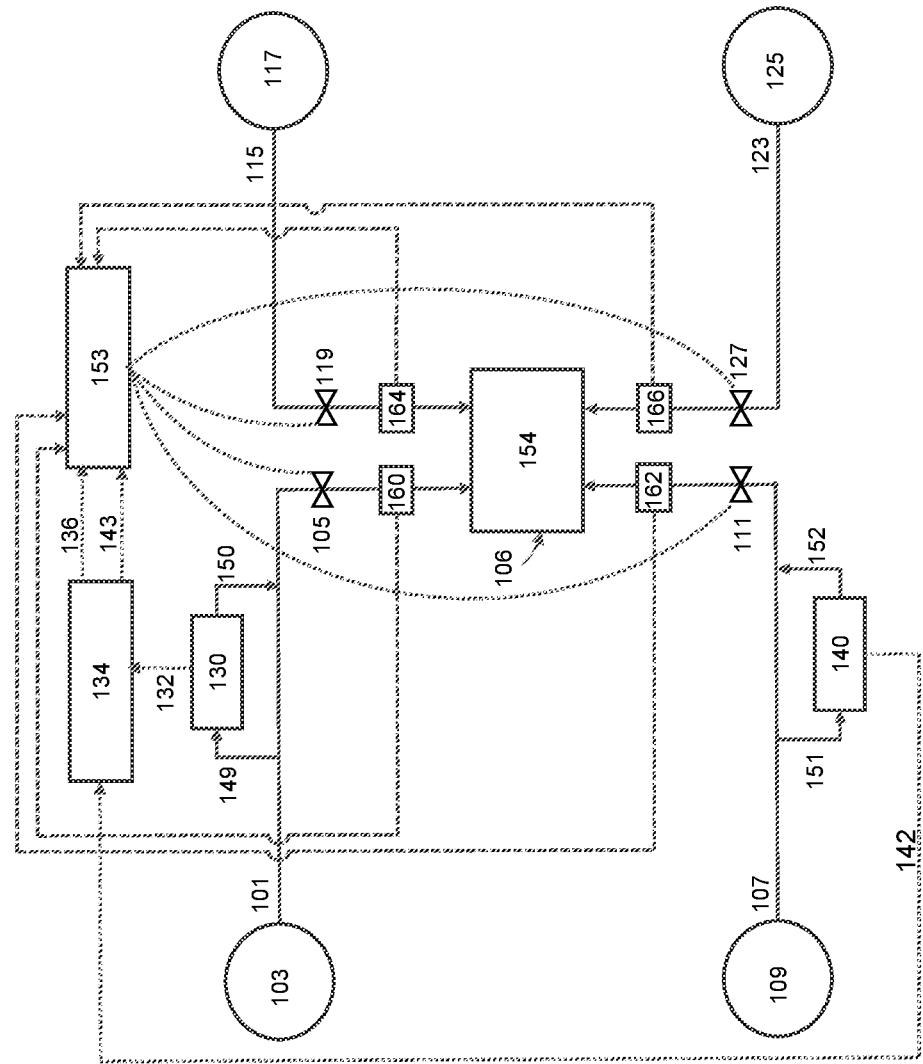
FIG. 1 is a flow diagram depicting a first illustrative, non-limiting embodiment of the described systems and methods.

Gasoline production typically involves blending several blendstocks that originate from a petroleum refinery. In addition to refinery-derived blendstocks, refineries may also procure gasoline blend components from non-refinery sources, such as natural gasoline from crude oil/natural gas production, low octane naphtha from petrochemical aromatics operations, aromatics (primarily toluene), heavy aromatic by-products of petrochemical aromatics operations, MTBE (for gasoline exports), miscellaneous imported gasoline components and transmix gasoline obtained from pipeline operations. The streams that provide blendstocks for production of neat gasoline (i.e., undiluted with ethanol) generally include the following:

Light Straight Run Naphtha (LSR) is a high volatility, low octane component produced directly from crude oil distillation.

Isomerate is a high volatility moderate octane component. The isomerization process increases octane by converting straight chain paraffinic (low octane) species to branched or iso species (higher octane).

Reformate is a low volatility, high octane component produced via catalytic reforming of heavy naphtha from crude distillation. The reforming process takes very low octane naphtha and increases its octane level by converting straight paraffin compounds to branched and cyclic naphthene compounds and converting these and other feed naphthenes into high octane aromatics.

Catalytically cracked gasoline (FCC gasoline) is a moderate volatility component with octane in the general range of average finished gasoline. The FCC cracks large compounds in heavy gas oil and, in some cases, crude oil bottoms, yielding products in the gasoline and distillate range. Olefins from the FCC feed alkylation units.

Alkylate is a moderate volatility component with octane rating typically falling somewhere between regular and premium grade market octane. Alkylate is produced by combining light olefins from the FCC (butylene and propylene) with isobutane to produce largely C7 to C9 branched paraffins.

Butane and pentane are used in limited quantities to achieve maximum allowable Reid vapor pressure (RVP) according to government regulations that vary depending upon geographic location and season.

Finished gasoline meets US Environmental Protection Agency requirements for use in light-duty and medium-duty gasoline-powered vehicles. However, these specifications include relatively few parameters/properties that can be met using a variety of different blendstocks. Thus, the blendstocks listed above may be combined in different proportions to produce a neat gasoline or blendstock for oxygenate blending (BOB) that has varying volatility depending upon the mixture of hydrocarbon streams utilized to make it.

Optimization of the gasoline blending process must consider a variety of characteristics of both the blendstocks and the resulting gasoline. Among others, such characteristics can include cost and various measurements of volatility, octane, and chemical composition. Producing differentiated gasolines in this manner allows mid-grade and premium grade gasolines to be produced at a terminal on demand, rather than requiring the shipment of complete premium gasoline or oxygenate-free blendstocks ("BOBs") to the terminal for storage and later distribution. Producing mid-grade and premium grade gasolines in this manner can substantially reduce pipeline shipping volumes and inventory requirements and can increase product slate flexibility at the terminal.

One hydrocarbon stream that is advantageously utilized as a gasoline blend stock is butane. Butane is abundant in most refineries and has an octane number that typically increases the overall octane number of the finished gasoline. However, the quantity of butane in the blend is typically limited by government specification that regulate the maximum vapor pressure of a finished gasoline.

Although hydrocarbons usually represent a major component of gasoline, it has been found that certain oxygen containing organic compounds can be advantageously included as gasoline components. These oxygen containing organic compounds are referred to as oxygenates, and they are useful as gasoline components because they are usually of high octane and may be a more economical source of gasoline octane than a high-octane hydrocarbon blending component such as alkylate or reformate. Oxygenates which have received substantial attention as gasoline blending agents include ethanol, t-butyl alcohol, methyl t-butyl ether, ethyl t-butyl ether, and methyl t-amyl ether. However, alcohols, and particularly ethanol, have become one of the most widely used oxygenates.

The term ethanol, when used herein, refers to any ethanol-containing solution that can be used in an ethanol and gasoline blend. The term thus includes starch-derived ethanol, sugar-derived ethanol, and cellulose-derived ethanol. The term ethanol may include pure ethanol, a solution comprising ethanol, an ethanol-water solution or azeotrope, nominally anhydrous ethanol, an alcohol solution comprising ethanol which may or may not include other alcohols, a solution comprising ethanol and denaturants, and other oxygenate solutions that contain ethanol. Ethanol, as used herein, may or may not comply with ASTM D4806-21 or similar specifications.

Government regulations often require that ethanol is present in finished gasoline at a certain minimum vol. %. Additionally, butane is a favored component in gasoline, but the quantity of butane that can be added is limited by the high vapor pressure of butane and government limits on maximum allowable vapor pressure. Ethanol is often blended with a neat gasoline or blend for oxygenate blending (BOB) to produce a finished gasoline and/or a certified gasoline. Ethanol has an octane rating of about 113 and butane has an octane rating of about 94. Thus, blending ethanol and optionally, butane with a BOB to produce a finished gasoline means a refinery must produce a lower volatility BOB that will meet maximum volatility specifications for a finished gasoline once it is blended with ethanol at a blending terminal subject to government-specified volatility limits. For example, a typical premium grade neat gasoline blend for oxygenate blending (BOB) has an octane value in the range from 88 to 93 before ethanol addition, while a typical regular grade neat gasoline BOB has an octane value in the range from 80 to 87 before ethanol addition.

Increasing AKI of the finished gasoline beyond the level required by government specifications for a given fuel grade is called "excess octane" or "octane giveaway" and decreases overall refinery profit. The present methods and systems minimize improve estimation of final AKI for a given finished gasoline by minimizing excess octane while assuring the gasoline will meet government specifications. The present processes and systems achieve this by measuring the octane of one or more neat gasoline streams of varying octane ratings (typically a premium octane neat gasoline and a regular octane neat gasoline) but importantly, does not measure the octane of an ethanol stream or a butane stream that may be included in the blend to produce a finished and/or certified gasoline. Instead, estimated octane values are utilized for the ethanol and the butane streams when calculating a volumetric blend ratio of the amount of each stream needed to produce a finished and/or certified gasoline. Some embodiments may additionally include sensors for measuring the volatility of the premium octane neat gasoline and the regular octane neat gasoline, while using pre-determined estimated values for one or more measures of volatility for the ethanol stream and the butane stream. These measurements are then considered (or accounted for) when calculating the volumetric blend ratio to assure the produced finished gasoline does not exceed maximum volatility specifications.

A first embodiment of the system and method for decreasing octane giveaway is depicted in FIG. 1. A first pipe 101 conveys or flows a premium octane neat gasoline 103 and comprises a first valve 105 that regulates flow of the premium octane neat gasoline 103 at a known rate through the first pipe 101 into a receptacle 106. The premium octane neat gasoline 103 has an AKI that may vary depending upon geographic location but is generally in the range from 88 to 93. As used herein, the term anti-knock index is given its commonly accepted definition, which is the arithmetic mean of the research octane number and the motor octane number for that gasoline.

A second pipe 107 flows or conveys a regular octane neat gasoline 109 and comprises a second valve 111 that regulates flow of the regular octane neat gasoline 109 through the second pipe 107 at a known rate into the receptacle 106. The regular octane neat gasoline 109 has an AKI that is generally in the range from 80 to 87. A third pipe 115 or conduit flows a stream of butane 117 and comprises a third valve 119 that regulates the flow of the butane 117 through the third pipe 115 at a known rate in to the receptacle 106. A fourth pipe 123 or conduit flows a stream of ethanol 125 and comprises a fourth valve 127 that regulates flow of the ethanol 125 through the fourth pipe 123 at a known rate into the receptacle 106.

A first analyzer cell 130 continually receives and analyzes samples of the premium octane neat gasoline 103 to produce first analytical data 132 that is received and utilized by analyzer 134 to calculate premium octane values 136 comprising a premium research octane number and a premium motor octane number. The analyzer 134 comprises a computer processor and memory containing programming that is executed by the processor (not individually depicted). The programming may comprise an algorithm or computer model that correlates features recognized in the analytical data obtained from each analyzer cell with research octane number or motor octane number of each sample analyzed.

A second analyzer cell 140 continually receives and analyzes samples of the regular octane neat gasoline 109 to produce second analytical data 142 that is received by the analyzer 134 and used to calculate regular octane values 143 comprising a regular research octane number 146 and a regular motor octane number 148. The analyzer 134 may utilize any of a variety of analytical technologies and data analysis techniques to identify one or more patterns within data and correlate these patterns with an octane number selected from research octane number and motor octane number. These analytical technologies include, but are not limited to, optical spectroscopy selected from mid-infrared and near-infrared spectroscopy, Ramen spectroscopy and nuclear magnetic resonance (NMR) spectroscopy. Each of these technologies rapidly analyzes a sample to produce spectral data comprising a set of discrete digitized data points. By utilizing a technology that can analyze samples of a gasoline stream at high frequency, the system receives rapidly updated and reliable data regarding the octane number(s) of the neat gasoline being analyzed.

Further referring to FIG. 1, the first analyzer cell 130 receives samples of the premium octane neat gasoline 103 via a first slipstream inlet conduit 149, and each sample that is analyzed in the first analyzer cell 130 is returned to the first pipe 101 via first slipstream return conduit 150. In a likewise manner, the second analyzer cell 140 receives samples of the regular octane neat gasoline 109 from the second pipe 107 via a second slipstream inlet conduit 151, and each sample that is analyzed in the second analyzer cell 140 is returned to the second pipe 107 via second slipstream return conduit 152.

A programmable logic controller 153 blends a first finished gasoline 154 in the receptacle 106 The programmable logic controller 153 receives the premium octane values 136 and the regular octane values 143 from analyzer 134 and takes these values into account when periodically (alternatively, continually) calculating a volumetric blend ratio to produce a first finished gasoline 155. The volumetric blend ratio comprises a volume of the ethanol 125 that may vary depending upon local government regulations (typically 10 vol. %), a volume of at least one of the premium octane neat gasoline 103 and the regular octane neat gasoline 109, and optionally a volume of the butane 117 that is added when the first programmable logic controller 153 calculates the quantity of butane 117 that can be added to the first finished gasoline 154 without exceeding the maximum vapor pressure allowed by government specifications for a finished gasoline at a particular geographic location on a given calendar date.

The programmable logic controller 153 or equivalent device comprises a computer processor and memory that contains programming that is executed by the processor to calculate the first volumetric blend ratio based upon values received for the premium research octane number, the premium motor octane number, the regular research octane number, the regular motor octane number, and a pre-determined octane value for the butane that is selected from a research octane number, motor octane number and anti-knock index. Importantly, the programmable logic controller 153 does not receive either octane number measurements or vapor pressure measurements for the butane 117 in third pipe 115 or ethanol 125 in the fourth pipe 123 when calculating the first volumetric blend ratio. Instead, programmable logic controller 153 utilizes pre-determined, estimated values for the expected or anticipated octane rating and vapor pressure of the butane 117 and the ethanol 125 when calculating the first volumetric blend ratio. This allows the premium octane neat gasoline 103 and/or regular octane neat gasoline stream 109 to have a research octane number and/or a motor octane number that is lower than that of the first finished gasoline due to the increased octane provided by the ethanol 125, and optionally, butane 117 that contribute to the final AKI octane rating.

Returning to the embodiment depicted in FIG. 1, the programmable logic controller 153 operates to implement the calculated volumetric blend ratio by communicating with the first valve 105, the second valve 111, the third valve 119 and the fourth valve 127. Each valve may comprise a valve controller (or valve positioner) that accurately and precisely controls the degree of opening for the valve it controls, thereby regulating the flow rate through each pipe and implementing the first volumetric blend ratio to produce the finished gasoline 154 in the receptacle 106. Each valve is preferably of a design that accurately regulates variable flow through the valve when regulated by a controller or positioner, that may comprise a butterfly valve, gate valve an orifice valve or any other valve capable of accurately and precisely regulating flow. The flow of butane may be regulated by a butane injection valve. The butane injection valve may provide butane in either a continuous manner or via periodic injections sufficient for a given batch of finished gasoline that meets all vapor pressure specifications for a finished gasoline.

In some embodiments, the material flowing through each pipe is maintained at a constant known pressure to allow more precise flow rate past each valve when the valve is opened a specific percentage. This allows the volumetric blend rate to be implemented by the programmable logic controller based upon these known invariant pressures. However, some embodiments comprise analyzing the volumetric flow rate of one or more of the regular octane neat gasoline, premium octane neat gasoline, butane stream and ethanol stream to control for potential variations in the supply pressure of material (i.e., net gasoline, ethanol or butane) in each pipe. In such embodiments, each stream may have a constant volumetric flow rate or a variable volumetric flow rate that is monitored by flow meters to measure liquid flow through each pipe at a location between each valve and its corresponding downstream receptacle. The programmable logic controller then receives these periodic flow measurements from at least one flow meter associated with each pipe. Each flow meter may be selected from a variety of conventional metering devices that include, but are not limited to, Corolis flow meters, magnetic flow meters, ultrasonic flow meters, vortex flow meters and differential pressure flow meters.

In the embodiment depicted in FIG. 1, a first flow meter 160 measures the pressure of the premium octane neat gasoline 103 in the first pipe 101 downstream from the first valve 105. A second flow meter 162 measures the flow of the regular octane neat gasoline 109 in the second pipe 107 downstream from the second valve 111. A third flow meter 164 measures the pressure of the butane 117 in the third pipe 115 downstream from the third valve 119, and a fourth flow meter 166 measures the flow of the ethanol 125 in the fourth pipe 123 downstream from the fourth valve 127. Each flow meter sends its respective flow rate measurement to the programmable logic controller 153, which takes each flow rate measurement into account when calculating the volumetric blend ratio and when sending a signal to control the degree (i.e., 1-100%) to which each valve is opened to implement the calculated volumetric blend ratio. Each valve is preferably of a design that accurately regulates flow through the valve when adjusted by a controller or positioner that may comprise a butterfly valve, a gate valve, an orifice valve or any other valve capable of accurately and precisely regulating flow. The flow of butane may be regulated by a butane injection valve. The butane injection valve may provide butane in either a continuous manner or via periodic injections sufficient for a given batch of finished gasoline that meets all vapor pressure specifications.

Figure 2:
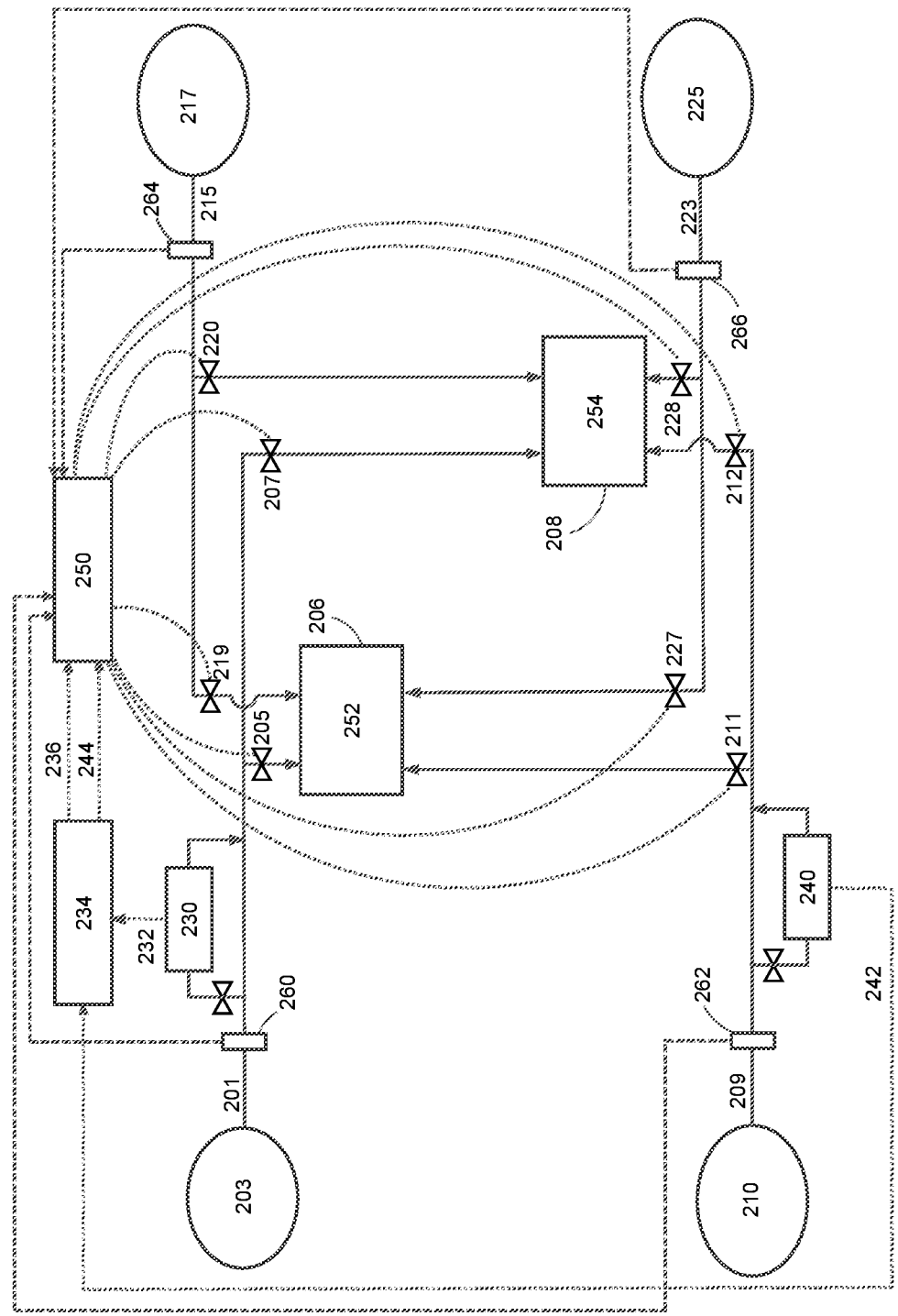
FIG. 2 is a flow diagram depicting a second illustrative, non-limiting embodiment of the described systems and methods.

A second embodiment of the system and method for decreasing octane giveaway is depicted in FIG. 2. A first pipe 201 flows (or conveys) a premium octane neat gasoline 203 and comprises a first valve 205 that regulates flow of the premium octane neat gasoline 103 at a known rate through the first pipe 101 into a first receptacle 206. The first pipe 201 further comprises a second valve 207 that regulates flow of the premium octane neat gasoline 203 at a known rate through the first pipe 201 into a second receptacle 208. The premium octane neat gasoline 203 has an anti-knock index (AKI) that may vary depending upon geographic location but is generally in the range from 88 to 93 and is lower than the AKI of a finished premium octane gasoline. As used herein, the AKI of a given gasoline is defined as the arithmetic mean of the research octane number and the motor octane number for that gasoline.

Referring again to FIG. 2, a second pipe 209 flows or conveys a regular octane neat gasoline 210 and comprises a third valve 211 that regulates flow of the regular octane neat gasoline 210 through the second pipe 209 at a known rate into the first receptacle 206. The second pipe further comprises a fourth valve 212 that regulates flow of the regular octane neat gasoline 210 through the second pipe 209 at a known rate into a second receptacle 208. The regular octane neat gasoline 109 has an AKI that is generally in the range from 80 to 87. A third pipe 215 or conduit flows a stream of butane 217 and comprises a fifth valve 219 that regulates the flow of the butane 217 through the third pipe 215 at a known rate into the first receptacle 206. The third pipe 215 further comprises a sixth valve 220 that regulates the flow of the butane 217 through the third pipe 215 at a known rate into the second receptacle 208. A fourth pipe 223 or conduit flows a stream of ethanol 225 and comprises a seventh valve 227 that regulates flow of the ethanol 225 through the fourth pipe 223 at a known rate into the first receptacle 206. The fourth pipe 223 further comprises an eighth valve 228 that regulates the flow of the ethanol 225 through the fourth pipe 226 at a known rate into the second receptacle 208.

A first analyzer cell 230 periodically (or alternatively, continually) receives and analyzes samples of the premium octane neat gasoline 203 to produce first analytical data 232 that is received and utilized by analyzer 234 to calculate premium octane values 236 comprising a premium research octane number and a premium motor octane number that are passed along to programmable logic controller 250. The analyzer 234 comprises a computer processor and memory containing programming that is executed by the processor (not individually depicted) to calculate the premium octane values 236. The programming may comprise an algorithm or computer model that correlates features recognized in the data obtained from the first analyzer cell 230 with research octane number or motor octane number of each sample analyzed by the analyzer 234.

A second analyzer cell 240 periodically (or alternatively, continually) receives and analyzes samples of the regular octane neat gasoline 210 to produce first analytical data 242 that is received and utilized by analyzer 234 to calculate regular octane values 244 comprising a regular research octane number and a regular motor octane number. The regular octane values 244 are sent to programmable logic controller 250.

The analyzer may utilize any of a number of different technologies to identify one or more patterns within data and correlate these patterns with an octane number selected from research octane number and motor octane number. These technologies include, but are not limited to, optical spectroscopy selected from mid-infrared and near-infrared spectroscopy, Ramen spectroscopy and nuclear magnetic resonance (NMR) spectroscopy. Each of these technologies rapidly analyzes a sample to produce spectral data comprising a set of discrete digitized data points. By utilizing a technology that can analyze samples of a gasoline stream with high frequency, the system receives rapidly updated and reliable data regarding the octane number(s) of the neat gasoline being analyzed.

In some embodiments, separate analyzers may monitor each of the first and second analyzer cells, with each analyzer sending calculated octane values to a programmable logic controller. In some embodiments, each analyzer cell receives a slipstream of the gasoline that is analyzed via a slipstream inlet conduit from at least one of the first pipe and the second pipe, where the sample that is analyzed in an analyzer cell at a given moment is optionally retained in a sample recovery tank for eventual return to either the first pipe or the second pipe, or is immediately returned to either the first pipe or the second pipe via a slipstream return conduit. In some embodiments, the functions of the first analyzer cell and the second analyzer cell are performed by a single analyzer cell that alternately receives and analyzes each of the premium octane neat gasoline and the regular octane gasoline in succession and sends calculated octane values for each neat gasoline to the programmable logic controller.

Further referring to the embodiment depicted in FIG. 2, a programmable logic controller 250 calculates a first volumetric blend ratio to produce a first finished gasoline 252 in the first receptacle 206. The programmable logic controller 250 receives from the analyzer 234 premium octane values 236 comprising the premium research octane number and premium motor octane number. The programmable logic controller 250 also receives from analyzer 234 regular octane values 244 comprising calculated values for regular research octane number and regular motor octane number for the regular octane neat gasoline 210. The programmable logic controller 250 periodically (or alternatively, continually) calculates a first volumetric blend ratio (not depicted) that takes the octane number values into account to produce the first volumetric blend ratio, which comprises a volume of the ethanol 225 that may vary depending upon local government regulations (typically 10 vol. % to 15 vol. %), a volume of at least one of the premium octane neat gasoline 203 and the regular octane neat gasoline 210, and optionally a volume of the butane 217 that is added when the programmable logic controller 250 calculates the quantity of butane 217 that can be added to the first volumetric blend ratio without exceeding the maximum vapor pressure allowed by government specifications for a finished gasoline at a particular geographic location on a given calendar date.

The programmable logic controller 250 operates to implement the calculated first volumetric blend ratio by communicating with a valve controller (or valve positioner) associated with each of the first valve 205, the third valve 211, the fifth valve 219 and the seventh valve 227 to produce the first finished gasoline 252 in the first receptacle 206. Each valve controller (alternatively, valve positioner) accurately and precisely controls the degree of opening for the valve it controls, thereby regulating the flow rate of each first finished gasoline component into the first receptacle 206. Each valve controller (alternatively, valve positioner) accurately and precisely controls the degree of opening for the valve it controls, thereby regulating the flow rate of each component added to produce the first finished gasoline. A first flow meter 260 measures the volume of the premium octane neat gasoline 203 dispensed into the first receptacle 206. A second flow meter 262 measures the volume of the regular octane neat gasoline 2010 dispensed into first receptacle 206. A third flow meter 264 measures the volume of butane 217 dispensed into first receptacle 206. Finally, a fourth flow meter 266 measures the volume of ethanol 225 dispensed into first receptacle 206. Speaking generally, each valve is preferably of a design that accurately regulates variable flow through the valve when regulated by a controller or positioner. In some embodiments, each valve may comprise a butterfly valve, gate valve, an orifice valve or any other type of valve capable of accurately and precisely regulating fluid or gaseous flow.

In instances where the vapor pressure of the finished gasoline to be produced is projected to meet or exceed the maximum vapor pressure for a finished gasoline that are allowed by government specifications following blending of ethanol, the blending of additional butane is prevented by the inventive processes and systems.

Returning to the embodiment depicted in FIG. 2, programmable logic controller 250 calculates a second volumetric blend ratio to produce a second finished gasoline 254 in the second receptacle 208. The programmable logic controller 250 receives from the analyzer 234 premium octane values 236 comprising calculated values for premium research octane number and premium motor octane number and regular octane values 244 comprising calculated values for regular research octane number and regular motor octane number for the regular octane neat gasoline 210. The programmable logic controller 250 periodically (or alternatively, continually) calculates a second volumetric blend ratio (not depicted) that takes the octane number values into account, where the second volumetric blend ratio comprises a volume of the ethanol 225 that may vary depending upon local government regulations (typically 10 vol. % to 15 vol. %), a volume of at least one of the premium octane neat gasoline 203 and the regular octane neat gasoline 210, and optionally a volume of the butane 217 that is added when the programmable logic controller 250 calculates the quantity of butane 217 that can be added to the second volumetric blend ratio without exceeding the maximum vapor pressure allowed by government specifications for a finished gasoline at a particular geographic location on a given calendar date.

Programmable logic controller 250 operates to implement the calculated second volumetric blend ratio by communicating with a valve controller (or valve positioner) associated with each of the second valve 207, the fourth valve 212, the sixth valve 220 and the eighth valve 228 to produce the second finished gasoline 254 in the second receptacle 208. Each valve controller (alternatively, valve positioner) accurately and precisely controls the degree of opening for the valve it controls, thereby regulating the flow rate of each component added to produce the second finished gasoline. A first flow meter 260 measures the volume of the premium octane neat gasoline 203 dispensed into the second receptacle 208. A second flow meter 262 measures the volume of the regular octane neat gasoline 210 dispensed into second receptacle 208. A third flow meter 264 measures the volume of butane 217 dispensed into second receptacle 208. Finally, a fourth flow meter 266 measures the volume of ethanol 225 dispensed into second receptacle 208.

Each valve is preferably of a design that accurately regulates variable flow through the valve when regulated by a controller or positioner. In some embodiments, each valve may comprise a butterfly valve, gate valve, an orifice valve or any other type of valve capable of accurately and precisely regulating fluid or gaseous flow.

Preferably, the second finished gasoline is a different finished gasoline than the first finished gasoline, and is selected from a premium octane finished gasoline, a mid-grade octane finished gasoline and a regular octane finished gasoline.

Each programmable logic controller or equivalent device comprises a computer processor and memory that contains programming that is executed by the processor to calculate the first volumetric blend ratio based upon values received for the premium research octane number, the premium motor octane number, the regular research octane number, the regular motor octane number, and a pre-determined octane value estimates for the butane and the ethanol that are selected from a research octane number, motor octane number and anti-knock index.

Importantly, each programmable logic controller does not receive octane number measurements or vapor pressure measurements of the butane in the third pipe. Further, each programmable logic controller does not receive octane number measurements or vapor pressure measurements of the ethanol in the fourth pipe when calculating the first volumetric blend ratio or the second volumetric blend ratio. Instead, each programmable logic controller utilizes pre-programmed (i.e., assigned or estimated) values that predict the octane number and vapor pressure of the butane and the ethanol when calculating each volumetric blend ratio. This allows the premium octane neat gasoline and/or regular octane neat gasoline stream to have a research octane number and/or a motor octane number that is lower than the first finished gasoline due to the increased octane provided by the ethanol, and optionally, butane that contribute to the final AKI number.

In some embodiments, the material flowing through each pipe is maintained at a constant known pressure to allow more precise flow rate past each valve when the valve is opened a specific percentage. In some embodiments, each programmable logic controller receives periodic pressure measurements from a pressure sensor associated with each pipe at a location upstream from each valve. In the embodiment depicted in FIG. 2, a first pressure sensor 260 measures the pressure of the premium octane neat gasoline 203 in the first pipe 201. A second pressure sensor 262 measures the pressure of the regular octane neat gasoline 210 in the second pipe 209. A third pressure sensor 264 measures the pressure of the butane 217 in the third pipe 215, and a fourth pressure sensor 266 measures the pressure of the ethanol 225 in the fourth pipe 223. Each pressure sensor sends their respective pressure measurement to the programmable logic controller 250, which takes each pressure measurement into account when calculating the first volumetric blend ratio and the second volumetric blend ratio. Speaking generally, alternative embodiments not depicted may instead utilize a flow meter attached to each pipe at a location downstream from each valve, but upstream from a receptacle, similar to the arrangement depicted in FIG. 1.

Figure 3:
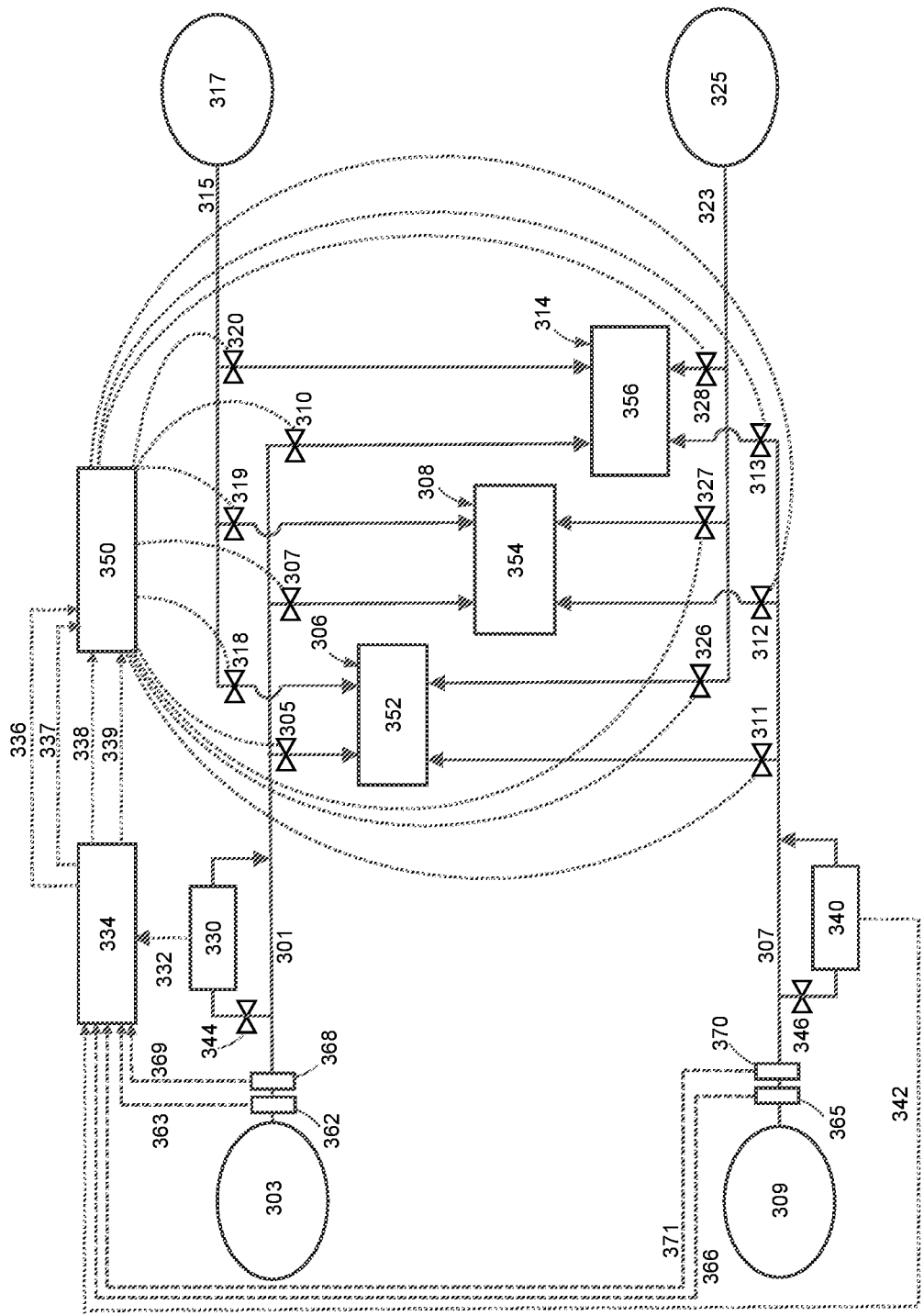
FIG. 3 is a flow diagram depicting a third illustrative non-limiting embodiment of the described systems and methods.

A third embodiment of the system and method for decreasing octane giveaway is depicted in FIG. 3. A first pipe 301 flows (or conveys) a premium octane neat gasoline 303 and comprises a first valve 305 that regulates flow of the premium octane neat gasoline 303 at a known rate into a first receptacle 306, a second valve 307 that regulates flow of the premium octane neat gasoline 303 at a known rate into a second receptacle 308 and a third valve 310 that regulates flow of the premium octane neat gasoline 303 at a known rate into a third receptacle 314. The premium octane neat gasoline 303 has an anti-knock index (AKI) that may vary depending upon geographic location but is generally in the range from 88 to 93. As used herein, the AKI of a given gasoline is defined as the arithmetic mean of the research octane number and the motor octane number for that gasoline.

Referring again to FIG. 3, a second pipe 307 flows or conveys a regular octane neat gasoline 309 and comprises a fourth valve 311 that regulates flow of the regular octane neat gasoline 309 at a known rate into the first receptacle 306, a fifth valve 312 that regulates flow of the regular octane neat gasoline 309 at a known rate into the second receptacle 308 and a sixth valve 313 that regulates flow of the regular octane neat gasoline 309 at a known rate into a third receptacle 314. The regular octane neat gasoline 309 has an AKI that is generally in the range from 80 to 87. A third pipe 315 or conduit flows a stream of butane 317 and comprises a seventh valve 318 that regulates the flow of the butane 317 through the third pipe 315 at a known rate into the first receptacle 306, an eighth valve 319 that regulates flow of the premium octane neat gasoline 303 at a known rate into the second receptacle 308 and a ninth valve 320 that regulates flow of the premium octane neat gasoline 303 at a known rate into the third receptacle 314. A fourth pipe 323 or conduit flows a stream of ethanol 325 and comprises a tenth valve 326 that regulates flow of the ethanol 325 at a known rate into the first receptacle 306, an eleventh valve 327 that regulates flow of the ethanol 325 at a known rate into the second receptacle 308 and a twelfth valve 328 that regulates flow of the ethanol 325 at a known rate into the third receptacle 314.

A first analyzer cell 330 continually analyzes samples of the premium octane neat gasoline 303 to produce first data 332 that is received by analyzer 334, which in turn executes an algorithm that converts first data 332 to automatically calculate a premium research octane number 336 and a premium motor octane number 337. The analyzer 334 comprises a computer processor and memory containing programming that is executed by the processor (not individually depicted). The programming may comprise an algorithm or computer model that correlates features recognized in first data 332 obtained from the first analyzer cell 330 with research octane number or motor octane number of each sample analyzed by the analyzer 334.

A second analyzer cell 340 periodically (or alternatively, continually) receives samples of the regular octane neat gasoline 309 to produce second data 342 that is received by the analyzer 334, which in turn executes an algorithm that converts second data 342 into regular research octane number 338 and a regular motor octane number 339. In some embodiments, the second analyzer cell sends data to a second analyzer (not depicted) to convert the data into a research octane number and motor octane number for the sample in the second analyzer cell, where the second analyzer then sends these octane number values to a programmable logic controller. In embodiment depicted in FIG. 3, the functions of multiple analyzers are performed by a single analyzer 334 that receives signals from both the first analyzer cell 330 and the second analyzer cell 340 and functions to calculate a first volumetric blend ratio, a second volumetric blend ratio and a third volumetric blend ratio.

Each analyzer may utilize any of a variety of known technologies to identify one or more patterns within data and correlate these patterns with an octane number selected from research octane number and motor octane number. These technologies include, but are not limited to, optical spectroscopy selected from mid-infrared and near-infrared spectroscopy, Ramen spectroscopy and nuclear magnetic resonance (NMR) spectroscopy. Each of these technologies rapidly analyzes a sample to produce spectral data comprising a set of discrete digitized data points. By utilizing a technology that can analyze samples of a gasoline stream at high frequency, the system receives rapidly updated and reliable data regarding the octane number(s) of the neat gasoline being analyzed.

In some embodiments, each analyzer cell receives a slipstream of the gasoline that is analyzed via a slipstream inlet conduit from at least one of the first pipe and the second pipe, where the sample that is analyzed in an analyzer cell at a given moment is soon thereafter returned to either the first pipe or the second pipe via a slipstream return conduit. In the embodiment depicted in FIG. 3, delivery of a sample to first analyzer cell 330 is controlled by first analyzer cell valve 344 while delivery of a sample to second analyzer cell 340 is controlled by second analyzer cell valve 346. Operation of each analyzer cell valve is periodic and may be operated by a timer, or optionally, controller by a signal sent from the analyzer (not depicted) just prior to receipt and analysis of first data 332 or second data 342 by analyzer 334.

Further referring to the embodiment depicted in FIG. 3, programmable logic controller 350 blends a first finished gasoline 352 in first receptacle 306. The programmable logic controller 350 receives from the first analyzer 330 calculated values for premium research octane number 336, premium motor octane number 337 obtained from analysis of the premium octane neat gasoline 303, and regular research octane number 338 and regular motor octane number 339 obtained from analysis of the regular octane neat gasoline 309. Programmable logic controller 350 additionally receives from a first premium volatility sensor 362 a first premium volatility measurement 363 and receives from first regular volatility sensor 365 a first regular volatility measurement 366. The measurement obtained from each volatility sensor may be, but is not limited to, vapor pressure, a distillation temperature (e.g., the temperature at which a certain percentage of the neat gasoline boils at 1 atm, such as a 50% or T50) and a liquid to vapor ratio temperature (e.g., V/L=10, V/L=20, etc.).

Some embodiments additionally include a second distinct type of volatility measurement for each neat gasoline stream. Further referring to the embodiment depicted in FIG. 3, a second premium volatility sensor 368 sends a second premium volatility measurement 369 to the first analyzer 334 and a second regular volatility sensor 370 sends a second regular volatility measurement 371 to the analyzer 334. In embodiments that employ two volatility sensors per neat gasoline stream, the second premium volatility sensor 368 is a distinct type of sensor from the first premium volatility sensor 362 provides a distinct type of volatility measurement that is selected from a vapor pressure, a distillation temperature (e.g., T10, T50, T90) and a liquid to vapor ratio temperature (e.g., V/L=10, V/L=20). Similarly, the second regular volatility sensor 370 is a distinct type of volatility sensor from the first regular volatility sensor 365 and provides a distinct type of volatility measurement that is selected from a vapor pressure, a distillation temperature (e.g., T10, T50, T90) and a liquid to vapor ratio temperature (e.g., V/L=10, V/L=20, etc.). If the distillation temperature is a T50, it typically is in the range from 150° F. to 260° F. for each of a regular neat gasoline stream and a premium neat gasoline stream prior to blending.

In some embodiments, the two distinct types of volatility measurements obtained for each neat gasoline stream may be a vapor pressure measurement and a distillation temperature (e.g., T50) measurement. Obtaining at least two types of volatility measurements per neat gasoline stream facilitates the ability of the programmable logic controller to predict the vapor pressure and/or distillation temperature of the finished gasoline once the neat gasoline is mixed with ethanol and optionally, butane. This allows the programmable logic controller to accurately predict the quantity of butane that can be added to produce the finished gasoline without exceeding government specifications for maximum vapor pressure.

Returning to the third embodiment depicted in FIG. 3, the programmable logic controller 350 either periodically or continually calculates a first volumetric blend ratio (not depicted) that takes the octane number values into account and each volatility measurement into account to produce a first finished gasoline 352, where the first volumetric blend ratio comprises a volume of ethanol 325 that may vary depending upon local government regulations (typically 10 vol. %), a volume of at least one of the premium octane neat gasoline 303 and the regular octane neat gasoline 309, and optionally a volume of the butane 317 that is added when the first programmable logic controller 350 calculates the maximum quantity of butane 317 that can be added to the first volumetric blend ratio without exceeding the maximum vapor pressure allowed by government specifications for a finished gasoline at a particular geographic location on a given calendar date.

Each programmable logic controller or equivalent device comprises a computer processor and memory that contains programming that is executed by the processor to calculate the first volumetric blend ratio based upon values received for the premium research octane number, the premium motor octane number, the regular research octane number, the regular motor octane number, and a pre-determined octane value for the butane that is selected from a research octane number, motor octane number and anti-knock index. Importantly, each programmable logic controller does not receive octane number measurements or vapor pressure measurements of the butane in the third pipe or the ethanol in the fourth pipe when calculating the first volumetric blend ratio. Instead, each PLC utilizes pre-programmed values for the octane rating and vapor pressure of the provided butane and ethanol when calculating the first volumetric blend ratio. This allows the premium octane neat gasoline and/or regular octane neat gasoline stream to have a research octane number and/or a motor octane number that is lower than the first finished gasoline due to the increased octane provided by the ethanol, and optionally, butane that contribute to the final AKI number.

Returning to the embodiment depicted in FIG. 3, the programmable logic controller 350 operates to implement the calculated first volumetric blend ratio by communicating with a valve controller (alternatively, a valve positioner or equivalent device) that is associated with each of the first valve 305, fourth valve 311, seventh valve 318 and tenth valve 326. Each valve controller accurately and precisely controls the degree of opening for the valve it controls, thereby regulating the flow rate through each pipe and implementing the first volumetric blend ratio to produce the first finished gasoline 352 in the first receptacle 306. Each valve is preferably of a design that accurately regulates variable flow through the valve when regulated by a controller or positioner, that may comprise a butterfly valve, gate valve an orifice valve or any other valve capable of accurately and precisely regulating flow.

In a similar manner, programmable logic controller 350 blends a second finished gasoline 354 in second receptacle 308. As previously described for the first volumetric blend ratio, programmable logic controller 350 either periodically or continually calculates a second volumetric blend ratio (not depicted) that takes the octane number values and each volatility measurement into account to produce a second finished gasoline 354, where the second volumetric blend ratio comprises a volume of ethanol 325 that may vary depending upon local government regulations (typically 10 vol. %), a volume of at least one of the premium octane neat gasoline 303 and the regular octane neat gasoline 309, and optionally a volume of the butane 317 that is added when the programmable logic controller 350 calculates the maximum quantity of butane 317 that can be added to the second volumetric blend ratio without exceeding the maximum vapor pressure allowed by government specifications for a finished gasoline at a particular geographic location on a given calendar date.

Programmable logic controller 350 operates to implement the calculated second volumetric blend ratio by communicating with a valve controller (alternatively, a valve positioner or equivalent device) associated with each of the second valve 307, fifth valve 312, eighth valve 319 and eleventh valve 327. Each valve controller accurately and precisely controls the degree of opening for the valve it controls, thereby regulating the flow rate through each pipe and implementing the second volumetric blend ratio to produce the second finished gasoline 354 in the second receptacle 308. Each valve is preferably of a design that accurately regulates variable flow through the valve when regulated by a controller or positioner, that may comprise a butterfly valve, gate valve an orifice valve or any other valve capable of accurately and precisely regulating flow.

In a similar manner, programmable logic controller 350 blends a third finished gasoline 356 in third receptacle 314. As previously described for the first volumetric blend ratio, programmable logic controller 350 either periodically or continually calculates a third volumetric blend ratio (not depicted) that takes the octane number values into account and each volatility measurement into account to produce the third finished gasoline 354, where the third volumetric blend ratio comprises a volume of ethanol 325 that may vary depending upon local government regulations (typically 10 vol. %), a volume of at least one of the premium octane neat gasoline 303 and the regular octane neat gasoline 309, and optionally a volume of the butane 317 that is added when the programmable logic controller 350 calculates the maximum quantity of butane 317 that can be added to the third volumetric blend ratio without exceeding the maximum vapor pressure allowed by government specifications for a finished gasoline at a particular geographic location on a given calendar date.

Programmable logic controller 350 operates to implement the calculated third volumetric blend ratio by communicating with a valve controller (alternatively, a valve positioner or equivalent device) associated with each of the third valve 310, sixth valve 313, ninth valve 320 and twelfth valve 328. Each valve controller accurately and precisely controls the degree of opening for the valve it controls, thereby regulating the flow rate through each pipe and implementing the third volumetric blend ratio to produce the third finished gasoline 356 in the third receptacle 314. Each valve is preferably of a design that accurately regulates variable flow through the valve when regulated by a controller or positioner, that may comprise a butterfly valve, gate valve an orifice valve or any other valve capable of accurately and precisely regulating flow.

Preferably, the stream that flows through each pipe is maintained at a constant known pressure to allow more precise flow rate past each valve when the valve is opened a specific percentage. In some embodiments, each programmable logic controller receives periodic or intermittent pressure measurements from a pressure sensor associated with each pipe at a location upstream from each valve. The programming executed by the programmable logic controller then accounts for the pressure in each pipe when calculating the volumetric blend ratio needed to produce the finished gasoline and when sending a signal to control the degree (i.e., 1-100%) to which each valve is opened to implement the calculated volumetric blend ratio. In some embodiments, the pressure in each pipe does not vary over time, and the volumetric blend rate can be calculated by the programmable logic controller based upon these known invariant pressures.

For calculated volumetric blend ratios that include at least some butane, the butane may be supplied by one or multiple sources of butane, which in some embodiments may be provided via a butane storage vessel or pipeline that is at a higher pressure than the pressure of the neat gasoline stream such that the butane is mixed with at least one neat gasoline stream at a known rate. In some embodiments this mixing occurs prior to the at least one neat gasoline and the butane being received by the receptacle along with ethanol to produce a finished gasoline. The addition of butane and ethanol to a receptacle for blending may occur at any point or in any order relative to one or more of the premium octane and regular octane neat gasoline streams.

Blending of each finished and/or certified gasoline may optionally be accomplished by splash blending into each receptacle. In some embodiments the receptacle may be located at a commercial fuel blending terminal because ethanol is ill-suited to pipeline transportation. The finished and/or certified gasoline may be blended from a petroleum-based blendstock for oxygenate blending (BOB) having a minimum octane number that will meet finished and/or certified gasoline specifications after addition of a specified amount of ethanol (e.g., 10 vol. %) and optionally, butane. The BOB can be transported to the commercial fuel blending terminal either via pipeline or in batches (i.e., by vehicle).

In some embodiments, each analyzer is a spectroscopic analyzer. Types of spectroscopic analyzers useful with the present methods and systems may be based on Raman spectroscopy, ultraviolet spectroscopy, infrared spectroscopy and near-infrared spectroscopy. The quantitative data generated by these analyzers can represent properties of refined petroleum products or blendstocks such as (but not limited to): flash temperature, research octane number, motor octane number, antiknock index, boiling point, density, viscosity, molecular composition or class, elemental analysis, freezing point, carbon residue, pour point, cloud point, vapor pressure, Reid vapor pressure, flammability range, wax and asphaltene contents, cetane number, aniline point, and carbon-to-hydrogen ratios. By utilizing such analyzers, the programmable logic controller receives rapid and reliable data regarding properties of the neat gasoline that is flowing through each upstream pipe. Additionally, the samples taken from and returned to the pipe by the analyzer cells allow reuse of the material, as opposed to conventional hand measurement methods that can modify the refined petroleum product and therefore make it unsuitable of being used as a conventional fuel.

Computers and programmable logic controller embodiments herein may feature routines, programs, objects, components, data structures, and the like, which perform particular tasks or implement control or determination operations. Computer executable instructions, associated data structures, and program modules represent examples of the program code means for executing acts of the methods disclosed herein. Computing devices within certain embodiments may include general or more specific computing systems, which may include: a processing unit, a system memory, and a system bus that couples various system components including the system memory to the processing unit. Processing units can execute computer-executable instructions designed to implement features of computer system, including features of the present invention. The system bus may be any of several types of bus structures including a memory bus or memory controller, a peripheral bus, and a local bus using any of a variety of bus architectures. The system memory includes read only memory ("ROM") and random-access memory ("RAM"). A basic input/output system ("BIOS"), containing the basic routines that help transfer information between elements within computer system, such as during start-up, may be stored in ROM.

The computer system may also include hard disk drive (or other storage media such as a solid-state disk) for reading from and writing to hard disk, disk drive for reading from or writing to removable disk, and optical disk drive for reading from or writing to removable optical disk, such as, for example, a CD-ROM or other optical media. The hard disk drive, disk drive, and optical disk drive may be connected to the system bus by hard disk drive interface, disk drive-interface, and optical drive interface, respectively. The drives and their associated computer-readable media provide nonvolatile storage of computer-executable instructions, data structures, program modules, and other data for the computer system. Although the example environment described herein employs hard disk, removable disk and removable optical disk, other types of computer readable media for storing data can be used. In some embodiments, the computer system may be connectable to computer networks, such as, for example, an office-wide or enterprise-wide computer network, an intranet, and/or the Internet. Computer system can exchange data with external sources, such as, for example, remote computer systems, remote applications, and/or remote databases over such computer networks. In some embodiments, a computer system may include network interface, through which computer system receives data from external sources and/or transmits data to external sources. The network interface facilitates the exchange of data with remote computer system. Network interface can logically represent one or more software and/or hardware modules, such as, for example, a network interface card and corresponding Network Driver Interface Specification ("NDIS") stack. Similarly, in some embodiments, the computer system includes input/output interface, through which the computer system receives data from external sources and/or transmits data to external sources.

In some embodiments, program code comprising one or more program modules may be stored on hard disk, disk drive, optical disk, ROM or RAM, including an operating system, one or more application programs, other program modules, and program data. In one embodiment, a user may enter commands and information into computer system through keyboard, pointing device, or other input devices, such as, for example, a microphone, joystick, game pad, scanner, or the like. These and other input devices can be connected to the processing unit through input/output interface coupled to system bus. Input/output interface logically represents any of a wide variety of different interfaces, such as, for example, a serial port interface, a PS/2 interface, a parallel port interface, a Universal Serial Bus ("USB") interface or may even logically represent a combination of different interfaces.

In some embodiments, a monitor or other display device may also be connected to system bus via video interface. Other peripheral output devices, such as, for example, printers, can also be connected to computer system.

A control system may include one or more controllers and may optionally be connected to one or more sensors such as flow rate monitors (meters) and temperature monitors. These connections may take place via wired or wireless communications systems. Alternatively, these connections may take place via pneumatic linkage, magnetic connection, or through other methods known in the art. A control system may include a combination of software and hardware within a network to balance the industrial infrastructure. In some embodiments, control systems may include one or more of the following: as programmable logic controllers (PLCs), supervisory control and data acquisition (SCADA), industrial automation and control systems (IACS), remote terminal units (RTUs), intelligent electronic devices (IEDs) control severs, and sensors. PLCs are capable of performing various industrial applications with inbuilt modules like power supply, CPU, I/O modules, and other communication modules. The PLCs can be integrated or modular. A modular PLC is compact and fixed with limited I/O functions, whereas integrated PLC extends I/O modules based on its features. The input module may be connected with sensors, while actuators or other output devices are optionally connected with the output module.

SCADA systems may be used for monitoring long-distance field sites through a centralized mechanism. They generally contain devices such as PLCs or other commercial hardware modules to be distributed in various locations. They are known to provide capabilities of supervision at the supervisory level.

Distributed control systems (DCS) may also be employed. These systems are typically used to control productions in one location. The desired set point is maintained to be sent to the controller or actuator instructing valves. This data may be retained for future references or used in advanced control strategies. A supervisory control loop may be used by each DCS to manage multiple local devices or controllers. Furthermore, a DCS is capable of eliminating the impact of a single fault on the whole system.

In the scenario where more than one controller is implemented in a control system, the more than one controller can be interconnected with other controls, or the more than one controller can be independent from other controllers. A variety of control systems may be featured in the embodiments. The embodiments can be realized in hardware, software, or a combination of hardware and software. Embodiments can be realized in a centralized fashion in one computer system, or in a distributed fashion where different elements are spread across several interconnected computer systems. Any kind of computer system, or other apparatus adapted for carrying out the methods described herein, is suited to perform the functions described herein.

In some embodiments, the programming executed by the programmable logic controller comprises an algorithm that recognizes features in spectral data obtained that are associated with octane number. Preferably, the spectral data comprise infrared spectral data, nuclear magnetic resonance spectral data, or both. The algorithm may be developed by analyzing spectral data that has been mathematically transformed to wavelets data to enhance subtle but informative features in the data. According to wavelet theory, spectral data can be decomposed into "approximation" and "detail" components. Wavelet packet transform (WPT) can be applied to de-noise and de-convolute spectra of crude oil samples by decomposing each spectrum into coefficients (wavelet coefficients) that represent the spectral data at distinct points across a range of frequencies. Wavelets can often enhance subtle but significant spectral features to increase the general discrimination power of the modeling approach. Using wavelets, a new set of basis vectors is developed in a new pattern space that takes advantage of the local characteristics of the data. These new basis vectors are capable of better conveying the information present in the data than axes that are defined by the original measurement variables. In some embodiments, spectral signals are "decomposed" by passing each spectrum through low-pass and high-pass scaling filters to produce a low-frequency "detail" coefficient dataset and a high-frequency "approximation" coefficient dataset. The approximation coefficients correspond to the "low-frequency signal" data in the spectra, while the detail coefficients usually correspond to the "noisy signal" portion of the data. The process of decomposition is continued with different scales of the wavelet filter pair in a step-by-step fashion to separate the noisy components from the signal until the necessary level of signal decomposition is achieved. Following signal decomposition, an algorithm is trained using wavelets coefficients data obtained from multiple samples of neat gasoline or other hydrocarbon gasoline blendstocks. This allows the algorithm (such as, but not limited to, a pattern recognition genetic algorithm) to recognize and associate certain distinguishing "signal" features in the wavelet coefficients data with the octane number (i.e., research octane or motor octane) of the premium neat gasoline stream and the regular neat gasoline stream. This allows the analyzer to rapidly measure the octane of each neat gasoline, then provide the measurements to the programmable logic controller to calculate the volumetric blend ratio needed to produce a finished gasoline.

The pattern-recognition genetic algorithm may utilize both supervised learning and unsupervised learning to identify the wavelet coefficients data that corresponds to features (from NIR data) and/or chemical shifts (from NMR data) that facilitate the ability of the genetic algorithm to accurately estimate the octane number of each sample. In embodiments that comprise supervised learning, manual curation to exclude certain data features is performed based upon the probability that such features may have resulted from areas of the spectral data with a low signal to noise ratio. The result of such manual curation is a subset of features (often the two or three largest principal components of the data) that is utilized by the trained genetic algorithm to quantify the research octane or motor octane number of each sample.

Gasoline is comprised of a complex mixture of volatile hydrocarbons such as aromatics, olefins, naphthenes and paraffins, with reformulated gasoline most often containing an oxygen-containing compound that is suitable for use as a fuel in a spark-ignition internal combustion engine. Gasoline typically boils over a temperature range of about room temperature to about 437° F. because gasoline is typically composed of a mixture of numerous hydrocarbons having different boiling points at atmospheric pressure, including aliphatic hydrocarbon components, as well as aromatic hydrocarbon components and branched hydrocarbons such as iso-octane. Thus, a gasoline fuel boils or distills over a range of temperatures, unlike a pure compound. This temperature range is approximate, of course, and the exact range will depend on the conditions that exist in the location where the automobile is driven. The distillation profile of the gasoline can also be altered by changing the mixture in order to focus on certain aspects of gasoline performance, depending on the time of year and geographic location in which the gasoline will be used. The term gasoline as used herein includes all grades of conventional gasoline, reformulated gasoline ("RFG"), diesel fuel, biodiesel fuel, jet fuel, and transmix. The term also includes blendstock for oxygenate blending ("BOB"), which is typically used for blending with ethanol. BOBs include RBOB (reformulated gasoline blendstock), PBOB (premium gasoline blendstock), CBOB (conventional gasoline blendstock), subgrade gasoline, and any other blendstock used for oxygenate or ethanol blending. Gasolines for ethanol blending can be gasolines used to create virtually any type of gasoline and ethanol blend.

The present methods and systems are capable of producing a finished motor gasoline that may include oxygenates such as ethanol, as defined in ASTM Specification D 4814 or U.S. Federal Specification VV-G-1690C. In some embodiments, a BOB comprising the premium neat gasoline comprises a research octane number that is larger than the research octane number of a BOB comprising the regular neat gasoline and the premium neat gasoline comprises a motor octane number that is larger than the motor octane number of the regular neat gasoline.

Each finished gasoline can be blended to achieve any anti knock index value (i.e., average of the motor octane number and research octane number) desired. Non-limiting examples of which include finished gasoline with an anti-knock index (AKI) between 80 and 95, finished gasoline with an AKI between 80 and 85, finished gasoline with an AKI between 85 and 90, and finished gasoline with an AKI between 90 and 95 In other embodiments, the composition has an AKI of at least 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 and useful ranges can be selected between any of these values (for example, from 80 to 110, from 87 to 105, etc.), inclusive. Octane rating standards and methods for measuring octane rating are known, and can include, but are not limited to, those described in ASTM D-4814, D-2699 and D-2700 and can include accepted reference values for numbers greater than 100. Preferably, when the finished gasoline is a premium octane finished gasoline, the volumetric blend ratio produces a finished gasoline having an AKI that is typically in the range from 91-95. Preferably, when the first finished gasoline is a mid-grade octane finished gasoline, the volumetric blend ratio produces a gasoline having an AKI that is typically in the range from 88-90. Preferably, when the first finished gasoline is a regular octane finished gasoline, the volumetric blend ratio produces a gasoline having an AKI that is typically in the range from 85-87. In some embodiments, the finished gasolines described herein meet U.S. government specifications for a certified gasoline.

In some embodiments, a fuel-grade ethanol (that may contain about 95% ethanol in combination with a denaturant) is added to a BOB (or neat gasoline) to produce a finished gasoline containing ethanol. In some embodiments, the target desired amount of alcohol in the finished gasoline product (e.g., 10 vol. %) is pre-calculated. The blend stock of gasoline is specifically formulated based on this desired quantity of ethanol, so that combined with an assumption of the volatility of the ethanol stream and the volatility of a butane stream, a known volume of the ethanol stream and/or butane stream can be blended with the neat gasoline to produce a finished gasoline product. This can take place as either a continuous or a batch process.

In the practice of the inventive process and systems, the finished ethanol-containing gasoline can be prepared by mixing any desired amount of ethanol with the relatively ethanol-free neat gasoline. For example, the finished gasoline could contain 1 vol. %, 10 vol. %, 50 vol. %, 95 vol. %, or any amount in between those values, or any other vol. % of ethanol that might be desired. However, it will be appreciated that the invention will typically be most useful in manufacturing ethanol-containing gasoline for distribution to motorists. Accordingly, the finished gasoline will usually contain an amount of ethanol that yields an oxygen content that conforms to all applicable government specifications.

A substantially hydrocarbon precursor blend that can be converted to a finished gasoline by mixing with one or more oxygenates (including alcohols) is referred to herein alternatively as a "subgrade", a BOB, or as a neat gasoline. Neat gasoline is defined as a gasoline blend that contains no ethanol. The combination of the subgrade, BOB or neat gasoline with the ethanol yields a finished gasoline. In some embodiments, the BOB comprises at least 80 vol. % of a mixture of hydrocarbons. The term "neat gasoline source" when used herein refers to a source of neat gasoline from any location, storage tank, vessel, container, or any point along a petroleum pipeline.

The subgrade or BOB is commonly called a RBOB (Reformulated Blendstock for Oxygenate Blending) when the finished gasoline product is destined for a reformulated gasoline market in the U.S. In other words, a subgrade includes (1) individual refinery streams suitable for use as a blend stock for gasoline, and/or (2) a blended gasoline stream formed by blending two or more streams, each of which are suitable for use as a gasoline blend stock. A suitable gasoline blend stock, when blended with other refinery streams, produces a neat gasoline that meets government specifications for a motor gasoline, as documented in U.S. Federal and State regulations. The term also includes blendstock for oxygenate blending ("BOB"), which is typically used for blending with ethanol. BOBs include RBOB (reformulated gasoline blendstock), PBOB (premium gasoline blendstock), CBOB (conventional gasoline blendstock), subgrade gasoline, and any other blendstock used for oxygenate or ethanol blending. The terms "gasoline blendstock," "oxygenate free blend stock," "subgrade," "subgrade blend," "reformulated blendstock for oxygenate blending (RBOB)," "blendstock for oxygenate blending (BOB)," "blendstock," "gasoline fraction" and neat gasoline are used interchangeably to mean a substantially hydrocarbon precursor blend which can be converted to a finished gasoline product by mixing with one or more oxygenates (including alcohols). The terms "blendstock" and "blend stock" are used interchangeably and have the same meaning.

Typically, a BOB has a decreased octane number (or AKI) that increases when blended with at least one of ethanol and butane. Splash blending alters the quality (e.g. heating value, distillation curve, vapor pressure) of finished gasoline, but in the present process, the final blends of finished gasoline containing ethanol will meet refinery target quality or ASTM specifications. In some embodiments, this may be assured by utilizing a neat gasoline for blending that has decreased vapor pressure such that the product finished gasoline remains below volatility limits after blending with more volatile ethanol and/or butane. In some embodiments, the refined petroleum products, gasoline blendstock or neat gasoline that flow through the first and second pipe can be any liquid or gaseous product that can be derived from crude oils through refining processes such as catalytic cracking and fractional distillation. These products can have physical and chemical characteristics that differ according to the type of crude oil and subsequent refining processes. Different types of refined petroleum products can include gasoline, diesel fuels, jet fuels, naphtha, marine gas oils, liquefied petroleum gasses, kerosene, lubricating oils and different types of fuel oils such as No. 2, No. 4, No. 5, and No. 6.

The gasoline blendstocks described herein typically have a normal boiling point within the range of 0° C. and 260° C., as determined by an ASTM D86 distillation. Feeds of this type include light naphtha typically having a boiling range of about C6 to 165° C. (330° F.); full range naphtha typically having a boiling range of about C5 to 215° C. (420° F.), heavier naphtha fractions boiling in the range of about 125° C. to 210° C. (260° F. to 412° F.), or heavy gasoline fractions boiling at, or at least within, the range of about 165° C. to 260° C. (330° F. to 500° F.), preferably about 165° C. to 210° C. In general, a gasoline fuel will distill over the range of from about room temperature to 260° C. (500° F.). In some embodiments, these streams may be treated to remove sulfur, nitrogen, and other undesired components.

Gasoline fractions for use as blendstocks to make each neat gasoline described herein may include C3 to C9 and larger hydrocarbons. In this application, the term "C(number)" means a hydrocarbon solution comprising hydrocarbon molecules having that number of carbon atoms, but not necessarily a pure solution. For example, refinery streams are usually separated by fractional distillation. A light naphtha cut is one such refinery stream, and because such a cut often contains compounds that are very close in boiling points, the separations are not precise. The light naphtha refinery cut is valuable as a source of iso-olefins (iC5 and iC6 compounds, for example) for forming an ether by reaction with ethanol. Thus, a C5 stream, for instance, may include C4 and up to C8 and higher. These hydrocarbon components may be saturated (alkanes), unsaturated (mono-olefins, including iso-olefins), and poly-unsaturated (diolefins, for example). Additionally, the components may be any or all of the various isomers of the individual compounds. Such a mixture may easily contain 150 to 200 components. Other hydrocarbon streams of C4 to C9 carbon atoms may be used in embodiments disclosed herein.

In some embodiments, gasoline blendstocks utilized to make a neat gasoline may include a C4 cut, which may include C3 to C5 or higher hydrocarbons (i.e., C6+). In other embodiments, gasoline fraction blendstocks may include a C5 cut, which may include C4 to C8 or higher hydrocarbons, including olefins. In other embodiments, gasoline fractions may include a C6 cut, which may include C4 to C9 or higher hydrocarbons, including olefins. In other various embodiments, gasoline fractions may include mixtures of one or more of C4, C5, C6, and C7+ hydrocarbons, where the mixture includes olefinic compounds. The above-described streams may include C4 to C7 streams, gasoline fractions, FCC gasoline, coker gasoline, and other refinery streams having similar properties. In some embodiments, the neat gasoline may include a concentration of 1 to 45 weight percent etherifiable iso-olefins; a concentration of 10 to 30 weight percent iso-olefins in other embodiments; and a concentration of 15 to 25 weight percent iso-olefins in yet other embodiments.

As disclosed herein, there are a number of principal methods for assessing the volatility of gasoline: (1) measuring the vapor to liquid ratio, (2) measuring the vapor pressure, and (3) measuring the distillation temperature. The vapor-liquid ratio (V/L) is an evacuated chamber method for determining temperatures for a vapor-liquid ratio of 20 to 1. It can be tested using ASTM D5188 or calculated using the distillation and vapor pressure data as described in ASTM D4814. The Reid method is a standard test for measuring the vapor pressure of petroleum products. Reid vapor pressure (RVP) is related to true vapor pressure but is a more accurate assessment for petroleum products because it considers sample vaporization as well as the presence of water vapor and air in the measuring chamber. The distillation temperature is another important standard for measuring the volatility of petroleum products. When blending gasoline with volatility modifying agents, the distillation temperature (TD) often cannot fall below a prescribed value. TD refers to the temperature at which a given percentage of gasoline volatilizes under atmospheric conditions and is typically measured in a distillation unit. For example, the gasoline can be tested for T(50), which represents the temperature at which 50% of the gasoline volatilizes, or it can be measured at T(10), T(90), or some other temperature value.

Any volatility measurement analysis of a neat gasoline as disclosed herein is performed in accordance with applicable EPA regulations and American Society for Testing and Materials ("ASTM") methods in force as of the date of the application. For measuring the Reid vapor pressure of reformulated gasoline, ASTM standard method D 5191-01, entitled "Standard Test Method for Vapor Pressure of Petroleum Products (Mini Method)" is preferred. The following correlation must also be used to satisfy EPA regulations:

$$RVPEPA=(0.956*RVPASTM)-2.39 \text{ kPa}$$

A typical volatility analyzer for measuring vapor pressure is the Minivap Online analyzer manufactured by Grabner® Instruments. Generally, a pump draws a sample of at least one neat gasoline into the analyzer for analysis, followed by return of the sample to the first or second pipe. In some embodiments, the vapor pressure measured may be Reid vapor pressure.

Some embodiments may comprise calculating a distillation temperature that may be accomplished by either direct contact between the analyzer and a neat gasoline stream or by drawing a slip-stream sample from a gasoline stream, measuring one or more properties of the sample, and returning the sample to the gasoline stream. Distillation properties measured may be, but are not limited to, the 10% distillation point ("T10"), the 50% distillation point ("T50"), and the 90% distillation point ("T90") as defined by the ASTM D 86-95 procedure, or by conventional alternative procedures. 10% distillation temperature (i.e., the temperature at which 10% of the fuel composition evaporates) (T10), the 50% distillation temperature (i.e., the temperature at which 50% of the fuel composition evaporates) (T50), and 90% distillation temperature (i.e., the temperature at which 90% of the fuel composition evaporates) (T90).

Throughout this patent application, whenever an analysis of gasoline is disclosed, the analysis can be performed in accordance with applicable EPA regulations, American Society for Testing and Materials ("ASTM"), and American Petroleum Institute ("API") methods and standards.

In some embodiments, the system and process further comprises a computer processor that executes programming comprising a database containing information regarding allowable maximum vapor pressure for the finished gasoline given the calendar date and geographic location, where the processor calculates the volumetric blend ratio based upon the maximum vapor pressure for the date and location. Preferably, the computer processor that performs this calculation is the same computer processor that calculates and implements the volumetric ratio to effect the production of the finished gasoline.

In embodiments, the finished gasoline comprises an alcohol that is preferably ethanol, where the finished gasoline comprises an alcohol concentration of at least about 0.01, 0.1, 0.2, 0.3, 0.4, 0.5, 0.6, 0.7, 0.8, 0.9, 1.0, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 99 or 100 vol. % based on the total volume of the composition (v/v %), and useful ranges can be selected between any of these values (for example, about 0.01 vol. % to about 99 vol. %, about 0.01 vol. % to about 1 vol. %, about 0.1 vol. % to about 10 vol. %, about 0.5 vol. % to about 10 vol. %, about 1 vol. % to about 5 vol. %, about 5 vol. % to about 25 vol. %, about 5 vol. % to about 95 vol. %, about 5 vol. % to about 80 vol. %, about 10 vol. % to about 95 vol. %, about 15 vol. % to about 95 vol. %, about 20 vol. % to about 95 vol. %, about 25 vol. % to about 95 vol. %, about 30 vol. % to about 95 vol. %, about 35 vol. % to about 95 vol. %, about 40 vol. % to about 95 vol. %, about 45 vol. % to about 95 vol. %, about 50 vol. % to about 95 vol. %, about 1 vol. % to about 99 vol. %, about 5 vol. % to about 99 vol. %, about 10 vol.

% to about 99 vol. %, about 15 vol. % to about 99 vol. %, about 20 vol. % to about 99 vol. %, about 25 vol. % to about 99 vol. %, about 30 vol. % to about 99 vol. %, about 35 vol. % to about 99 vol. %, about 40 vol. % to about 99 vol. %, about 45 vol. % to about 99 vol. %, about 50 vol. % to about 99 vol. %, about 5 vol. % to about 70 vol. %, about 10 vol. % to about 70 vol. %, about 15 vol. % to about 70 vol. %, about 20 vol. % to about 70 vol. %, about 25 vol. % to about 70 vol. %, about 30 vol. % to about 70 vol. %, about 35 vol. % to about 70 vol. %, about 40 vol. % to about 70 vol. %, about 45 vol. % to about 70 vol. %, and about 50 vol. % to about 70 vol. %, about 60 vol. % to about 90 vol. % based on the total volume of the composition). The concentration of alcohol, can be readily determined and, in some embodiments, depends on the desired alcohol content of the finished fuel.

The most straightforward way to incorporate ethanol and/or butane into gasoline is by mixing, or "splash blending," which is utilized in one aspect of the invention. Various subgrades of gasoline, including catalytically cracked naphtha, reformate, virgin naphtha, isomerate, alkylate, and others are mixed with a desired amount of alcohol at a mixing site. The blending site may be geographically proximate to the area from which the gasoline is to be distributed but could also be geographically distant from the place where the subgrade is prepared. In one embodiment, the resulting blend is passed to a suitable storage facility such as a holding tank, or to an element of a distribution system, such as a pipeline, rail car, tanker truck, or barge. Splash blending is accomplished by manually loading individual components in the proper proportions according to the finished product recipe. Components are normally added one at a time through discrete product meters and loading arms.

Other blending methods, which represent other aspects of the embodiments disclosed herein, include automatic sequential blending, on rack ratio blending, side stream blending, hybrid ratio blending, hybrid stream side blending, proportional blending, and non-proportional blending, among other arrangements known by those having skill in the art.

Automatic sequential blending is accomplished by loading individual components in the proper proportion according to the finished product recipe. This is accomplished by opening product line block valves one at a time through one meter/load arm position in a set sequence to complete the finished product.

On rack ratio blending is accomplished by simultaneously combining two or more products through dedicated unique meters in respective amounts and flow rates according to the finished product recipe. This is accomplished at the individual loading position while delivering into a truck or rail car. This process is typically automated.

Side stream blending is accomplished by simultaneously combining a minor product flow through a dedicated flow meter and control valve upstream of the major products meter and control valve. The minor product flow is controlled based on the blended stream. This process is typically automated.

Hybrid ratio blending is accomplished by simultaneously combining a ratio product with a sequential product stream through unique meters and control valves in respective amounts and flow rates according to the finished product recipe. This is accomplished at the individual loading position while delivering into a truck or rail car. This process is typically automated.

Hybrid side stream—The blending is accomplished by simultaneously combining a ratio/minor product through a dedicated meter and control valve with a sequentially blended product upstream of the final blend meter and control valve. The two respective streams are proportionally blended according to the finished product recipe. This is accomplished at the individual loading position while delivering into a truck or rail car. This process is typically automated.

Proportional blending—In this blending method, the flow of each component is controlled by the preset to ensure the final desired blend ratio is maintained throughout the entire loading process. The advantage is that the product being loaded is on specification throughout the entire course of the load.

Non-proportional blending—In this blending method, the flow of each component is controlled by the preset, similar to the proportional method; however, some components may be loaded at a fixed flow rate or sequentially rather than being loaded proportionally throughout the course of the load. The potential disadvantage is that the product being loaded may not meet final specification until the completion of the load.

In some embodiments, a terminal may include many pieces of equipment designed to safely offload fuel from multiple transportation modes, store it, and load it into trucks for delivery to fuel stations. Some of the most common equipment at terminals in various embodiments are: pipes, valves, meters, sensors, and pumps, but there are others known to those skilled in the art. Pipes, usually made of steel with welded joints, move fuel to storage tanks and deliver fuel to the loading rack. Valves are used throughout the system to control the flow of fuel. Meters measure the flow rate of fluids, while controllers regulate the flow rate of fuel (fluids) to ensure an accurate blend, and pumps move fuel throughout the terminal. Controllers are implemented at various points in the system to receive operational inputs (e.g., desired gasoline/alcohol ratios, octane desired, flow-rates, volumes, temperatures, pressures, chemical compositions, and other characteristics) and the controllers may also control system implementations such as valves, pumps and other operational equipment for desired outputs. Flow meters (monitors) in the embodiments herein may include oval gear meters, orifice-square edge, orifice-conic edge, venturi, pitot tube, electromagnetic, turbine, ultrasonic-transient time, Doppler, rotometer, vortex, or coriolis flow meters. Flow meters may also include ultrasonic or ultrasound flow meters, intrusive or humidified flow meters, venturi channels, overflow plates, radar flow meters, Coriolis flow meters, differential pressure flow meters, magnetic inductive flow meters and other types of flow meters. It is understood that other suitable flow meters known to those skilled in the art may also be used. The control system may include controllers, meters or sensors, pumps, valves, wiring or wireless connection/connectivity components, computers, and other components to control the flow of fluids.

As used herein, the term periodically means intermittently, or more specifically, an interval of time between repetitive events that may range from 1 millisecond to 24 hours.

Various embodiments of the inventive systems and methods are described herein and include features and concepts that may also be included in equivalents that are not specifically disclosed, but would be obvious to one having average skill in the art.

Every feature or limitation of the systems and processes described herein has been contemplated by the inventors and envisioned to be fully operable in combination with any other feature or limitation in combinations of two or more features that may not be explicitly disclosed herein as part of a single embodiment. Any feature or limitation of the inventive processes or systems described herein, whether integral or optional, is to be considered fully compatible with and/or operable in combination with any other described feature or limitation unless specifically stated herein.

We claim:

1. A system comprising:
   a premium octane pipe capable of flowing a premium octane neat gasoline and comprising a first valve capable of regulating flow through the premium octane pipe at a known rate;
   a regular octane pipe capable of flowing a regular octane neat gasoline and comprising a a second valve capable of regulating flow of the regular octane gasoline through the regular octane pipe at a known rate;
   a butane pipe capable of flowing butane and comprising a third valve capable of regulating flow through the butane pipe at a known rate;
   a first analyzer cell connected to the premium octane pipe capable of continually obtaining a premium research octane number and a premium motor octane number;
   a second analyzer cell connected to the regular octane pipe capable of continually obtaining a regular research octane number and a regular motor octane number; and
   a receptacle downstream of the first analyzer cell and the second analyzer cell that is capable of receiving and blending the premium octane gasoline, the regular octane gasoline, and the butane to produce a finished gasoline,
     wherein the first valve, the second valve, and the third valve are capable of regulating a blend ratio of the premium octane gasoline, the regular octane gasoline, and the butane in the blend based on the premium research octane number, the premium motor octane number, the regular research octane number and the regular motor octane number.

2. The system of claim 1, wherein the first valve, the second valve, and the third valve are additionally capable of regulating the blend ratio based on an estimated value for octane number of the butane that is selected from research octane number, motor octane number and anti-knock index.

3. The system of claim 2, additionally comprising a first sensor capable of obtaining a first premium volatility measurement from the premium octane neat gasoline and a second sensor capable of obtaining a first regular volatility measurement from the regular octane neat gasoline, wherein the first premium volatility measurement and the first regular volatility measurement are different members of the group consisting of vapor pressure, distillation temperature and a liquid to vapor ratio temperature, wherein the first valve, the second valve and the third valve are additionally capable of implementing the blend ratio based on the first volatility measurement and the second volatility measurement.

4. The system of claim 3, additionally comprising a third sensor capable of obtaining a second premium volatility measurement from the premium octane neat gasoline and a fourth sensor capable of obtaining a second regular volatility measurement from the regular octane neat gasoline,
   wherein the second premium volatility measurement and the first premium volatility measurement are different members of the group consisting of vapor pressure, distillation temperature and a liquid to vapor ratio temperature,
   wherein the second regular volatility measurement and the first regular volatility measurement are different members of the group consisting of vapor pressure, distillation temperature and a liquid to vapor ratio temperature,
   wherein each volatility measurement is accounted for in the blend ratio,
   wherein the first valve, the second valve, and the third valve are additionally capable of implementing the blend ratio based upon the second premium volatility measurement and second regular volatility measurement.

5. The process of claim 1, wherein the finished gasoline is a certified gasoline selected from the group consisting of a certified premium octane blended gasoline, a certified mid-grade octane blended gasoline, and a certified regular octane blended gasoline.

6. The system of claim 1, wherein the first analyzer cell and the second analyzer cell are operably connected to the same analyzer or multiple distinct analyzers.

7. A system for blending gasoline, comprising:
   a premium octane pipe capable of flowing a premium octane neat gasoline having an anti-knock index in the range from 88 to 93 and comprising a first valve capable of regulating flow through the premium octane pipe at a known rate;
   a regular octane pipe capable of flowing a regular-octane neat gasoline having an anti-knock index in the range from 80 to 87 and comprising a second valve capable of regulating flow through the regular octane pipe at a known rate;
   a butane pipe capable of flowing butane and comprising a third valve capable of regulating flow through the butane pipe at a known rate;
   an ethanol pipe capable of flowing ethanol and comprising a fourth valve capable of regulating flow through the ethanol pipe at a known rate;
   a first analyzer cell connected to the premium octane pipe capable of continually obtaining a premium research octane number and a premium motor octane number;
   a second analyzer cell connected to the regular octane pipe capable of continually obtaining a regular research octane number and a regular motor octane number;
   a receptacle downstream of the first analyzer cell and the second analyzer cell capable of receiving a gasoline blend comprising the premium octane neat gasoline, the regular octane neat gasoline, the butane and the ethanol;
   a programmable logic controller capable of producing the gasoline blend by continuously calculating a volumetric blend ratio of the premium octane neat gasoline, the regular octane neat gasoline, the butane, and the ethanol to produce the gasoline blend,
     wherein the calculating of the volumetric blend ratio at least partly depends upon the premium research octane number, the premium motor octane number, the regular research octane number, the regular motor octane number, a predicted value for octane number for the ethanol, a predicted volatility value for the ethanol a predicted octane number value for the butane and a predicted volatility value for the butane,
     wherein the programmable logic controller is capable of operating the first valve, the second valve, the third valve and the fourth valve to implement the volumetric blend ratio,
     wherein the gasoline blend is a finished gasoline selected from the group consisting of a finished premium octane blended gasoline, a finished midgrade octane blended gasoline and a finished regular octane blended gasoline.

8. The system of claim 7, wherein the first analyzer cell and the second analyzer cell are operably connected to the same analyzer or multiple distinct analyzers.

9. The system of claim 7, additionally comprising a first sensor capable of obtaining a first premium volatility measurement from the premium octane neat gasoline and a second sensor capable of obtaining a first regular volatility measurement from the regular octane neat gasoline,
   wherein the first premium volatility measurement and the first regular volatility measurement are the same type of measurement selected from the group consisting of vapor pressure, distillation temperature and a liquid to vapor ratio temperature,
   wherein the programmable logic controller is capable of receiving and accounting for the first premium volatility measurement and the first regular volatility measurement when calculating the volumetric blend ratio.

10. The system of claim 9, additionally comprising a third sensor capable of obtaining a second premium volatility measurement from the premium octane neat gasoline and a fourth sensor capable of obtaining a second regular volatility measurement from the regular octane neat gasoline,
    wherein the second premium volatility measurement and the first premium volatility measurement are different members of the group consisting of vapor pressure, distillation temperature and a liquid to vapor ratio temperature for the premium octane neat gasoline,
    wherein the second regular volatility measurement and the first regular volatility measurement are different members of the group consisting of vapor pressure, distillation temperature and a liquid to vapor ratio temperature for the regular octane neat gasoline,
    wherein the programmable logic controller is additionally capable of receiving and accounting for the second premium volatility measurement and the second regular volatility measurement when calculating the volumetric blend ratio.

11. The system of claim 10, wherein the vapor pressure is selected from research octane number, motor octane number and anti-knock index, wherein the distillation temperature is selected from 10% distillation temperature, 50% distillation temperature and 90% distillation temperature, wherein the liquid to vapor ratio temperature is a temperature at which the liquid to vapor ratio equals 20.

12. A gasoline blending system for decreasing octane giveaway, comprising:
    a premium octane pipe capable of flowing a premium octane neat gasoline, wherein the premium octane pipe comprises a first valve capable of regulating flow through the premium octane pipe into a first receptacle and second valve capable of regulating flow through the premium octane pipe into a second receptacle;
    a regular octane pipe capable of flowing a regular-octane neat gasoline, wherein the regular octane pipe comprises a third valve capable of regulating flow through the regular octane pipe into the first receptacle and fourth valve capable of regulating flow through the regular octane pipe into the second receptacle;
    a butane pipe capable of flowing butane and comprising a fifth valve capable of regulating flow through the butane pipe into the first receptacle and sixth valve capable of regulating flow through the butane pipe into the second receptacle;
    an ethanol pipe capable of flowing ethanol and comprising a seventh valve capable of regulating flow through the ethanol pipe into the first receptacle and sixth valve capable of regulating flow through the butane pipe into the second receptacle;
    a first infrared spectroscopy analyzer cell connected to the premium octane pipe to continually obtain a premium research octane number and a premium motor octane number;
    a second infrared spectroscopy analyzer cell connected to the regular octane pipe that is capable of continually obtaining a regular research octane number and a regular motor octane number;
    a first receptacle downstream of the first infrared spectroscopy analyzer cell and the second infrared spectroscopy cell capable of receiving and mixing a first splash blend comprising the premium octane neat gasoline, the regular octane neat gasoline, the butane and the ethanol;
    a second receptacle downstream of the infrared spectroscopy analyzer cell and the secondary infrared spectroscopy cell capable of receiving and mixing a second splash blend comprising the premium octane neat gasoline, the regular octane neat gasoline, the butane and the ethanol to produce a second finished gasoline;
    a first sensor capable of obtaining a first premium volatility measurement from the premium octane neat gasoline and a second sensor capable of obtaining a second premium volatility measurement from the premium octane neat gasoline,
       wherein the first premium volatility measurement and the second premium volatility measurement are different members of the group consisting of vapor pressure, distillation temperature and a liquid to vapor ratio temperature;
    a third sensor capable of obtaining a first regular volatility measurement from the regular octane neat gasoline and a fourth sensor capable of obtaining a second regular volatility measurement from the regular octane neat gasoline,
       wherein the first regular volatility measurement and the second regular volatility measurement are different members of the group consisting of vapor pressure, distillation temperature and a liquid to vapor ratio temperature;
    a programmable logic controller capable of continuously calculating a first volumetric blend ratio and a second volumetric blend ratio comprising the premium octane neat gasoline, the regular octane neat gasoline, the butane, and the ethanol,
       wherein the programmable logic controller is further capable of accounting for the premium research octane number, the premium motor octane number, the regular research octane number, the regular motor octane number and preset values for an octane number and a volatility value for the ethanol and the butane when calculating the first volumetric blend ratio and the second volumetric blend ratio, wherein the octane number is selected from a research octane number, a motor octane number and an anti-knock index value and the volatility value is selected from a vapor pressure, a distillation temperature and a liquid to vapor ratio temperature,
       wherein the programmable logic controller is further capable of receiving and accounting for the first premium volatility measurement, the second premium volatility measurement, the first regular volatility measurement and the second regular volatility measurement when calculating the first volumetric blend ratio and the second volumetric blend ratio, wherein the programmable logic controller is capable of operating the first valve, the third valve, the fifth valve and the seventh valve to implement the first volumetric blend ratio and produce the first splash blend in the first receptacle, wherein the programmable logic controller is capable of operating the second valve, the fourth valve, the sixth valve and the eighth valve to implement the second volumetric blend ratio and produce the second splash blend in the second receptacle.

13. The system of claim 12, wherein the first splash blend and the second splash blend are different members of the group consisting of a premium octane blended gasoline, a mid-tier octane blended gasoline, and a regular octane blended gasoline.

14. The system of claim 12, wherein the first analyzer cell and the second analyzer cell reside in either the same analytical analyzer or multiple distinct analytical analyzers.

15. The system of claim 12, wherein the vapor pressure is selected from research octane number, motor octane number and anti-knock index, wherein the distillation temperature is selected from 10 percent distillation temperature, 50 percent distillation temperature and 90 percent distillation temperature, wherein the liquid to vapor ratio temperature is a temperature at which the liquid to vapor ratio equals 20.

16. The system of claim 12, wherein the first premium volatility measurement and the first regular volatility measurement are a vapor pressure measurement and the second premium volatility measurement and the second regular volatility measurement are a 50 percent distillation temperature measurement.

17. The system of claim 12, wherein the premium neat gasoline comprises a research octane number that is larger than the regular neat gasoline research octane number and the premium neat gasoline comprises a motor octane number that is larger than the regular neat gasoline motor octane number.

* * * * *